(12) United States Patent
Boaretto et al.

(10) Patent No.: US 11,951,840 B2
(45) Date of Patent: Apr. 9, 2024

(54) SYSTEM FOR SMART COUPLING BETWEEN A ROAD IMPLEMENT AND A TRACTOR VEHICLE, SYSTEM AND PROCESS OF MANAGEMENT FOR ACTUATION OF AUXILIARY TRACTION ON ROAD IMPLEMENTS

(71) Applicant: FRAS-LE S.A., Caxias do Sul (BR)

(72) Inventors: Joel Boaretto, Caxias do Sul/RS (BR); Cesar Augusto Cardoso Teixeira de Albuquerque Ferreira, Caxias do Sul—Rio Grande do Sul (BR); Maicon Molon, Caxias do Sul—Rio Grande do Sul (BR); Diego Masotti, Caxias do Sul—Rio Grande do Sul (BR)

(73) Assignee: FRAS-LE S.A., Caxias do Sul (BR)

( * ) Notice: Subject to any disclaimer, the term of this patent is extended or adjusted under 35 U.S.C. 154(b) by 399 days.

(21) Appl. No.: 17/297,366

(22) PCT Filed: Nov. 27, 2019

(86) PCT No.: PCT/BR2019/050504
§ 371 (c)(1),
(2) Date: Nov. 23, 2021

(87) PCT Pub. No.: WO2020/107086
PCT Pub. Date: Jun. 4, 2020

(65) Prior Publication Data
US 2022/0289039 A1    Sep. 15, 2022

(30) Foreign Application Priority Data

Nov. 27, 2018  (BR) .......................... 102018074392-9
Oct. 4, 2019   (BR) .......................... 102019020993-3
Oct. 4, 2019   (BR) .......................... 102019020996-8

(51) Int. Cl.
  *B60L 15/20*  (2006.01)
  *B60L 7/10*   (2006.01)
  (Continued)

(52) U.S. Cl.
  CPC ................. *B60L 15/20* (2013.01); *B60L 7/10* (2013.01); *B60L 50/60* (2019.02); *B62D 59/04* (2013.01);
  (Continued)

(58) Field of Classification Search
  CPC .. B60L 15/20; B60L 7/10; B60L 50/60; B60L 2200/28; B60L 2240/461;
  (Continued)

(56) References Cited

U.S. PATENT DOCUMENTS 8,215,436 B2   7/2012  Degrave et al.
9,238,483 B2   1/2016  Hafner et al.
(Continued)

FOREIGN PATENT DOCUMENTS

BR   102016001644 A2   8/2017
BR   112017023691 A8   7/2018
(Continued)

OTHER PUBLICATIONS

International Search Report issued for PCT/BR2019/050504, dated Feb. 28, 2020.
(Continued)

*Primary Examiner* — James M McPherson
*Assistant Examiner* — Kyle J Kingsland
(74) *Attorney, Agent, or Firm* — Arentfox Shiff LLP

(57) ABSTRACT

The present invention relates to the fields of mechanical and electronic engineering, focusing on energy efficiency on freight transport systems. More specifically, the invention applies to Long Combination Vehicles (LCV), in which the semi-trailer is provided with an auxiliary traction system,
(Continued)

such as electric traction with regenerative braking, for example. The invention provides means for controlling the actuation of the auxiliary traction, which provides safe use and enhances economic and environmental savings in freight transport. In one embodiment, the invention provides a system for managing the auxiliary traction on a road implement that provides improved, safer drivability of the set.

14 Claims, 26 Drawing Sheets

(51) Int. Cl.
  *B60L 50/60* (2019.01)
  *B62D 53/08* (2006.01)
  *B62D 59/04* (2006.01)
(52) U.S. Cl.
  CPC ..... *B60L 2200/28* (2013.01); *B60L 2240/461* (2013.01); *B60L 2240/54* (2013.01); *B60L 2240/62* (2013.01); *B60L 2240/642* (2013.01); *B62D 53/0842* (2013.01)
(58) Field of Classification Search
  CPC ............. B60L 2240/54; B60L 2240/62; B60L 2240/642; B60K 6/52; B60W 30/18127; B62D 59/04; B62D 53/0842; B62D 53/08
  See application file for complete search history.

(56) References Cited

U.S. PATENT DOCUMENTS

| | | |
|---|---|---|
| 2008/0174174 A1 | 7/2008 | Burns et al. |
| 2010/0025131 A1 | 2/2010 | Gloceri et al. |
| 2011/0094807 A1 | 4/2011 | Pruitt et al. |
| 2014/0025245 A1* | 1/2014 | Fanourakis ........ B62D 53/0871 280/433 |
| 2015/0224845 A1 | 8/2015 | Anderson et al. |
| 2016/0318421 A1 | 11/2016 | Healy |
| 2018/0345952 A1* | 12/2018 | Layfield ................. B60L 15/20 |
| 2019/0210602 A1 | 7/2019 | Amigo |
| 2019/0291593 A1* | 9/2019 | Healy ...................... B60K 1/04 |
| 2021/0023951 A1* | 1/2021 | Gomberg ............... B60L 15/20 |

FOREIGN PATENT DOCUMENTS

| | | |
|---|---|---|
| WO | 2012080738 A1 | 6/2012 |
| WO | 2016179000 A1 | 11/2016 |

OTHER PUBLICATIONS

Written Opinion of the International Searching Authority issued for PCT/BR2019/050504, dated Feb. 28, 2020.

* cited by examiner

A                                           B

SYSTEM FOR SMART COUPLING BETWEEN A ROAD IMPLEMENT AND A TRACTOR VEHICLE, SYSTEM AND PROCESS OF MANAGEMENT FOR ACTUATION OF AUXILIARY TRACTION ON ROAD IMPLEMENTS

FIELD OF THE INVENTION

The present invention relates to the fields of mechanical and electronic engineering, focusing on energy efficiency on freight transport systems. More specifically, the invention applies to Long Combination Vehicle (LCV), in which the semi-trailer is provided with an auxiliary traction system, such as electric traction with regenerative braking, for example. The invention provides means for controlling the actuation of the auxiliary traction, which provides safe use and enhances economic and environmental savings in freight transport.

BACKGROUND OF THE INVENTION

Given environmental policies and sustainability programs associated with pressure to reduce the use of fossil fuels, the search for energy efficiency in the cargo transportation sector is increasingly desirable. The road transportation business, whether cargo or passenger, is one of the sectors that most demands fossil fuels, and any reduction in consumption in this business sector results in benefits for the transporter, reducing its operating cost. Further, said reduction also provides benefits to the environment since it reduces the emission of polluting gases and/or gases that intensify the greenhouse effect.

In Long Combination Vehicle (LCV), the energy demand is significant since it is necessary to overcome critical conditions of the cargo route, for example, situations of accentuated slope and/or irregular grounds. These situations require a large amount of energy to move the long combination vehicle, requiring more of the weight-power ratio of the combination.

In road implements, LCV's Kinetic Energy ((Mass×Speed$^2$))/2) is very expressive. Given the multiple possibilities of potential combinations provided for in Brazilian legislation, the present invention applies to any type of long combination vehicle. In this context, the Brazilian traffic legislation allows LCVs with up to 74 tons of Combined Total Gross Weight, which demands powerful tractor vehicles so that the weight/power ratio is adequate to the traffic conditions. In addition, in the road transport in Brazil and certain other countries, the highways have very irregular grounds and with countless ramp and slope situations. Thus, Long Combination Vehicle, considering the vehicle's tare plus the weight of the transported cargo, require a high engine power to overcome inertia. This whole context makes fuel one of the carrier's biggest expenses, being the variable that most influences the freight value. The present invention provides a solution to this problem.

LCVs operating under the conditions mentioned above also have a high demand for the brake system, since it is subjected to conditions of high mechanical demands under high temperatures, reducing the useful life of the brake system components and, consequently, increasing maintenance costs for safe operation.

The use of kinetic energy regeneration and energy storage systems provides substantial technical advantages for reducing fuel consumption, notably when said energy is used to generate traction in vehicles, in addition to providing less demand on the brake system.

Such systems are desirable in road implements to assist the traction of the tractor vehicle. However, a technical problem yet not satisfactorily resolved is to make the tractor vehicle's traction vector compatible with the implement's traction vector, to avoid safety problems in the set, both in a straight line and in curves. For the safe operation of a LCV comprising an implement provided with an auxiliary traction system, the implement will never be able to push the tractor vehicle. Therefore, a LCV of this type must comprise a system that guarantees the implement traction is merely auxiliary (or helper) to that of the tractor vehicle. For the safe operation of such a LCV, the auxiliary traction of the implement can never affect the directional attitude of the tractor vehicle or the combination.

In these and other circumstances, especially when angles occur between the tractor vehicle and the implement, resultant vectors appear that can generate instability in the long combination vehicles (or LCV, which comprises a tractor vehicle associated with at least one road implement). The magnitude of said technical problem is proportional to the angle between the tractor vehicle and the implement, or between the fifth wheel and kingpin, and the difference in traction between that of the tractor vehicle and that provided by the road implement provided with auxiliary traction.

Thus, it is desirable both from an environmental, as well as a safety and economic point of view, the use of ways for better energy exploitation of the Long Combination Vehicle, such as ways of reusing the energy dissipated by the sloping brake system for later use in situations requiring greater traction, such as in ramp situations.

Kinetic energy regeneration systems have been applied to vehicles to reduce fuel consumption, as well as reducing pollutant gas emissions. That way, the regenerated kinetic energy can be used as electrical energy to pull vehicles. However, kinetic energy regeneration systems have not been used in cargo transportation due to several technical difficulties that are overcome by the present invention.

Long Combination Vehicles have a high mass of the set and the transported cargo, which provides a condition of inertia favorable to the use of kinetic energy regeneration systems, the auxiliary traction in the semi-trailer. In regenerative braking systems, the energy dissipated during braking is converted into electrical energy and stored in batteries for later use in traction, for example, in slope situations. In addition, the reuse of energy resulting from braking helps to preserve the brake set and components associated with it, such as tires.

To the best of the knowledge of the inventors, until the present invention, long combination vehicles provided with auxiliary traction systems on the semi-trailer have not been embodied in practice due to technical difficulties including, but not limited to, the complex dynamics of directional stability of the set.

Aspects of the articulation system and variations in the stiffness of the chassis of Long Combination Vehicles provide freedom degrees amplifying the effects arising from the directional excitations of traffic.

In addition, the complexity is also related to the fact that currently a road implement such as a semi-trailer is a vehicle without representation in terms of traction, which serves only as a basis for the load, and the entire mobility force being performed by the tractor vehicle. Thus, the road implement only copies the trajectory and responds to dynamic stimuli/inputs from the tractor vehicle.

In the search in scientific and patent literature prior to art, the following documents dealing with the subject matter were found:

US20110094807A1 describes an electric trigger system including two electric motors, each one acting independently on each wheel, these motors being electrically powered through the energy from stored regenerative braking. A controller controls the two electric motors independently as such the wheels operate at the same or different speeds. In addition, the document mentions a means of collecting data from the tractor vehicle, such as vehicle speed and accelerations. In addition, the document mentions a means of collecting data from the tractor vehicle, such as vehicle speed and accelerations. However, such a solution does not mention the use of ways to prevent the jackknife effect, or as is known, the pocketknife or L effect, that is the document does not disclose or suggest security means to avoid this effect, which can bring safety risks and/or cause damage to the vehicle's drivability. In addition, said document neither mentions ways of managing the power applied to the wheels nor even indicates when such power should be applied. Moreover, the analysis of force vectors applied on the coupling between the tractor vehicle and the road implement is also not mentioned, impairing the set drivability.

US20080174174A1 describes a braking and propulsion regeneration system for truck trailers that performs acceleration and deceleration. Said system comprises a motor/generator coupled to the gearbox, an energy storage system storing the braking energy and provides it for traction, and a control system that controls the system and informs the tractor vehicle when the implement is operating. In addition, the document mentions the system controls each wheel independently on each side of the implement shaft. In addition, the document mentions a navigation system that indicates when the engine/generator must be activated to manage the stored and available energy for auxiliary traction. However, the document does not mention the use of ways to prevent the "jackknife" effect, also known as the pocketknife or L effect. The document does not mention details of how force vectors are analyzed in the coupling of the tractor vehicle with the implement and does not mention details about how the system is managed, as such the solution brought does not provide security elements and can interfere in the set drivability.

U.S. Pat. No. 8,215,436 describes a regenerative braking system for road implements using regenerated energy during braking for auxiliary traction, said energy being stored in a storage system. Said document discloses a system of accelerometers to check the acceleration, deceleration, inclination, and vibration of the road implement, as well as using a wheel speed sensor. The said solution, however, does not provide safety indications for the operation of the tractor-implement set, or the power management to be applied to the wheels, or any system of redundancies to guarantee the safe operation of the system. As is known, the long combination vehicles are extremely heavy and also carry heavy loads likewise, as such any failure generated by a system can cause a major accident, in addition to huge damage to transportation.

US20100025131A1 describes an electric propulsion system applied to vehicles comprising a chassis that supports at least one electric motor attached to its suspension. Said document discloses the use of a controller controlling the traction and/or controls the stability. However, the document does not disclose or suggest mechanisms to prevent the jackknife effect, also known as the pocketknife or L effect. In addition, said document does not disclose ways of managing the power applied to the wheels, even when such power is applied. Furthermore, it does not disclose any analysis of force vectors applied to the coupling between the tractor vehicle and the road implement.

BR102016001644 describes a proposal for a trailer provided with a kinetic energy recovery system from decelerations and its use for propulsion in times of acceleration. To this end, said document mentions the use of an electric motor connected with an energy storage system. However, the concept of this type of arrangement is fully anticipated by the USA documents mentioned above. In addition, the said document is not to be confused with the present invention or anticipates it, since no security means for preventing the jackknife effect, also known as the pocketknife or L effect, is disclosed. Furthermore, said document also does not disclose a means of managing the power applied to the wheels, or when and how such power is applied. Moreover, it does not mention any analysis of force vectors applied on the coupling between the tractor vehicle and the road implement.

Thus, from what is found in the researched literature, no documents were found anticipating or suggesting the teachings of the present invention, so as the solution proposed herein, in the inventors' view, has novelty and inventive step against the prior art.

SUMMARY OF THE INVENTION

The invention solves the prior art problems from a means of controlling the actuation of an auxiliary traction system in a semi-trailer present in a Long Combination Vehicle (LCV).

The inventive concept common to the several objects of the invention is a physical means providing the safe use of a road implement provided with auxiliary means of traction of a LCV. In the present invention, said physical medium is selected from: the fifth wheel and/or an intelligent kingpin; sensors at other monitoring points; sensors connected to the brake pedal; or combinations thereof.

In one embodiment, the invention additionally comprises a system for processing such data and sending signals to control the auxiliary traction system of the implement, and/or of the main traction of the tractor vehicle, so that the set operates more safely and/or efficiently.

In one embodiment, said set of information is processed by a control unit comprising a control algorithm, which commands the activation or not of the helper system.

The invention provides a means of controlling the auxiliary traction trigger, which provides safe use and enhances the economic and environmental gains in cargo transportation. The means of controlling or management of the invention provides safe use of the actuation of auxiliary traction in a road implement. The present invention also provides a means of controlling or system of management providing better drivability conditions for a LCV in which the implement is provided with an auxiliary traction system.

The present invention also provides a means of controlling or system of management that avoids the undesirable effect known as jackknife.

In one embodiment, the means of controlling or system of management of the invention comprises means of preventing failures of elements of the system itself, consisting of a system of security redundancies controlled by an intelligent, programmed, and pre-parameterized algorithm.

In one embodiment, the means of controlling or system of management of the invention additionally comprises an algorithm providing energy optimization of the tractor vehicle set and road implement through the prior analysis of the demands of roads ground based on the route to be adopted. In this embodiment, said algorithm manages the times of the most adequate storage and/or use of energy for auxiliary traction to assist the tractor vehicle in the situations of greatest demand, without interfering in the drivability conditions.

In one embodiment, the means of controlling or system of management of the invention additionally assists in the deceleration effect, providing, within the operating range, delay conditions in the heating of the brake system, which maintains or increases the brake performance, decreases the need for maintenance and increases the lifespan of the brake system components and related items.

The application of the invention in road implements results in several advantages for the combination and for the transport operation, such as: significant reduction in fuel consumption and environmental advantages; reduction of greenhouse gas emissions rates per kilometer traveled; increased vehicle lifespan; reduction of the need for maintenance of the tractor vehicle components, since the system assists in traction in times of torque request; reducing the requirement for said components; reduction of tire wear by distributing traction to more shafts; reduction of the brake system requirement, reducing the thermal load on them, avoiding the reduction of the friction coefficient of its components, minimizing the fading effect; preventing overheating of the brake components increasing lifespan thereof, for example, brake linings, drums, discs, and pads.

In addition, the present invention is green and ecofriendly technology as it significantly reduces fuel consumption by the vehicle and, consequently, reduces pollutant gas emissions. The invention also contributes to reducing the wear of friction elements, reducing the speed of regeneration, and increasing the lifespan of the tires by not heating the beads. The technology of the invention also improves the energy efficiency of the semi-trailer tractor vehicle set.

In an object, the present invention shows a system of management for actuation of an auxiliary traction system of a road implement.

In the invention, auxiliary traction is any element capable of providing a motive power for the road implement to act as a helper, this auxiliary traction element being capable of being activated/deactivated and/or controlled by a control system (4). In one embodiment, the auxiliary traction comes from an electric motor (10) and at least one energy storage system (3), in which said electric motor (10) interacts with at least one shaft of the road implement, being the operation of the electric motor (10) and the energy storage system (3) controlled by at least one control system (4) connected to the electric motor (10) and the energy storage system (3).

In one embodiment, the auxiliary traction is electric and comes from regenerative braking comprising at least one electric motor (10) and at least one electrical energy storage system (3), wherein at least one electric motor (10) interacts with at least a shaft of the road implement, the operation of the electric motor (10) and the electrical energy storage system (3) being controlled by at least one control system (4) connected to said electric motor (10) and electrical energy storage system (3)

In another object, the present invention shows a process of management for actuation of auxiliary traction in road implements, involving electrical traction and regenerative braking, wherein the road implement is equipped with a management system for electrical driving comprising at least one electric motor (10) and at least one electrical energy storage system (3), comprising the steps of:

a. identification of the slope ground degree wherein the road implement is passed through; and
b. selection of operating mode by means of a control system (4) comprised in the management system, the selection is made based on at least the slope degree identified.

Still in another object, the present invention shows an intelligent coupling system between road implement and tractor vehicle, wherein the road implement is equipped with a system of management for electrical actuation comprising at least one electric motor (10) and at least one electrical energy storage system (3), wherein the coupling system comprises at least one angular motion sensor and a vector load sensor communicating with a control system (4) of the system of management in road implements. In one embodiment, said angular motion or vector charging sensors are positioned in the fifth wheel and/or the kingpin.

It is also an object of the invention to provide communication between the tractor vehicle and the road implement from a communication means, wherein the road implement is provided with an intelligent traction system operating on one or more shafts of the implement making it possibly motive power. The system provides real action control on the road implement, the action being active and not passive. The invention system provides significant results, regardless of external conditions, whether favorable or not. Therefore, the operation does not depend on favorable wind conditions or the driver's driving mode, but the system acts in times of need, optimizing the energy balance of the combination, seeking a considerable reduction of fuel consumed through auxiliary traction on the road implement.

In addition, it is an object of the present invention of an electric traction kit with a regenerative system for road implements comprising at least one electric traction system, at least one regenerative system, and at least one mechanized system capable of coupling the electric traction system to the road implement.

It is also an object of the present invention a the system of management for electrical actuation in road implements involving electric traction and regenerative braking comprising a control system (4) communicating with an operation panel (5), wherein the operation panel (5) is provided with at least one traffic route of the road implement, said route containing data of the route's altimetric profile, wherein: the control system (4), provided with an algorithm, selects operating modes from data of the altimetric route profile, with the modes of operation being at least one of i) electric traction, ii) regenerative braking, iii) free shaft, or a combination thereof.

In another object of the invention, a LCV (Long Combination Vehicle) is provided comprising a semi-trailer provided with a system of management for actuation of auxiliary traction, wherein it comprises:

a. one or more sensors selected from: angular motion sensor; vector load sensor; brake use sensor; reverse gear sensor; wheel speed sensor; geolocation sensor; electric charge level sensor; or a combination of two or more thereof; and
b. a control system (4) receiving the signals from the sensors and, from the received signals, issues an auxiliary traction drive command.

Considering the variables pointed out in the prior art, such as the set weight, the brake system wear, the ground irregularities, there is a great potential for the application of intelligent regenerative systems, which can optimize the weight/power ratios, where the set mass (tractor vehicle+ semi-trailer(s)) associated with rugged ground conditions (ramps and slopes) promotes favorable situations for charging cycles (through kinetic energy recovery) and battery discharge to overcome specific traffic conditions, such as pronounced ramps. Thus, the present invention is perfectly applicable to any Long Combination Vehicles (LCV), such as road trains, bitrains, etc., wherein the weight/power ratio is high.

These and other objects of the invention will be immediately appreciated by those skilled in the art and will be described in detail below.

DETAILED DESCRIPTION OF THE INVENTION

Figure 1:
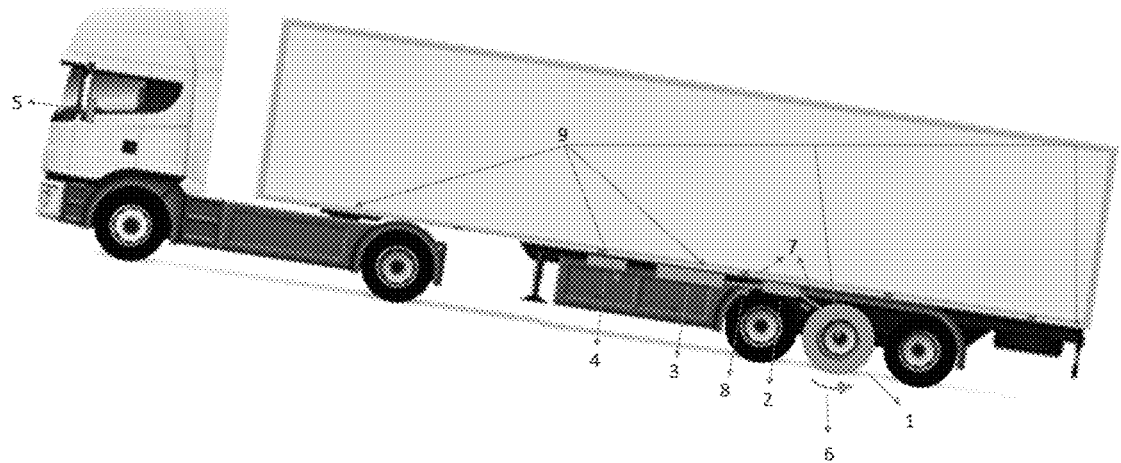
FIG. 1 shows an embodiment of the system of management of the present invention applied to a road implement under a ramp.

The inventive concept common to the various objects of the invention is a physical means providing safe use of a road implement provided with auxiliary means of traction of a LCV.

In the present invention, said physical means is selected from: the fifth wheel and/or an intelligent kingpin; sensors at other monitoring points; sensors connected to the brake pedal; or combinations thereof. The invention additionally comprises a system for processing such data and sending signals to control the auxiliary traction system of the implement, and/or the main traction of the tractor vehicle, so that the set operates more safely and/or efficiently.

In one embodiment, said set of information is processed by a command unit comprising a control algorithm, which commands the activation or not of the helper system.

In one embodiment, angular motion sensors and vector loading are powered by an external source and, based on the variation of said angular movements and vector forces in at least one direction, produce a variation in the output signal. The output signals are processed by a specific electronic circuit and made available to the VCU (Vehicle Control Unit), which uses the signal from these sensors as parameters for monitoring and controlling the auxiliary traction system.

In the present invention, "fifth wheel and/or smart kingpin" means a fifth wheel and/or a kingpin that is provided with one or more sensors sending signals to a control system of the coupling set of the tractor vehicle and implement traction vectors comprising an auxiliary traction or helper system.

It is another object of the invention to provide a process for controlling the auxiliary traction system of a road implement in a cargo vehicle set that comprises the receipt of a signal from: a fifth wheel and/or an intelligent kingpin; sensors at other monitoring points; sensors connected to the brake pedal; or combinations thereof.

In an embodiment of the invention, the implement traction auxiliary system or helper system comprises: (i) a kinetic energy recovery system in a decelerating condition (braking); (ii) a system for storing this energy in batteries; and (iii) an electric motor powered by the said batteries to serve as an auxiliary tractor element in times of greater demand from the group. In said embodiment, the helper system assists LCV to overcome route conditions wherein there are peaks in power demand and, consequently, peaks in fuel consumption. The present invention constitutes an additional safety system, which provides the conditions under which the operation of the LCV kinetic energy optimization system is safely performed in the particular operating conditions of a LCV comprising a front tractor vehicle and a rear road implement.

It is one of the objects of the invention to provide security in the optimization of the kinetic energy of a LCV with safety and lower fuel consumption.

It is another object of the invention to provide safety and shorter route time for a given LCV with a given load, since the invention LCV provides the use of additional power, particularly in ramps, by storing energy.

It is another object of the invention to provide safety in an auxiliary power system to support overtaking (helper).

It is another object of the invention to provide safety and increase the lifespan of the LCV due to less wear and tear on the tractor vehicle when compared to the LCV without the present invention.

It is another object of the invention to provide security and decrease the gas emission for the transportation of a given cargo in LCVs.

Other objects of the invention are to provide safety: (i) in the preservation of the brake system; (ii) less heating of them; (iii) in the increase of LCV security; (iv) in the greater stability of the tire beads, increasing its lifespan; (v) less damage to the pavement and an increase in its lifespan due to the division of LCV traction.

In one embodiment, the fifth wheel and/or the kingpin are provided with one or more angular sensors and one or more vector charging sensors, providing the mapping of coupling movement data between the tractor vehicle and the implement, or between the fifth wheel and the kingpin.

The invention provides safe use and enhances the economic and environmental gains in cargo transportation. The means of controlling or managing the invention provides safe use of auxiliary traction actuation on a road implement.

The present invention also provides a means of controlling or system of management that provides better drivability conditions for a LCV wherein the implement is provided with an auxiliary traction system.

The present invention also provides a means of controlling or management system that avoids the undesirable effect known as jackknife.

For the purposes of the present invention, a vehicle is a Long Combination Vehicle (LCV) comprising a tractor vehicle associated with at least one road implement.

The present invention describes a system of management for safe electrical actuation in the road implement controlling the uptake and storage of energy dissipated in the brake system during braking times and uses it for later electrical traction to assist the tractor vehicle in situations of power demand. Said system provides a reduction in fuel consumption since it uses the energy that would be dissipated in the brake system to assist in the traction of the tractor vehicle, saving fuel and making the system energy efficient. Furthermore, it allows a reduction in the emission of polluting gases due to a reduction in fuel consumption. Moreover, the system helps to preserve the brake system, reducing operator maintenance costs.

For the purposes of the present invention, "electrical actuation" refers to electrical actuation occurring on the road implement, such as electric traction and regenerative braking—parts of the objects of the invention, both of which are provided by an electric motor, or any electric machine with engine/generator functionality.

In one object, the present invention shows a system of management for electrical actuation in road implements, involving electrical traction and regenerative braking, comprising at least one electric motor (10) and at least one electrical energy storage system (3), wherein at least an electric motor (10) interacts with at least one shaft of the road implement, the operation of the electric motor (10) and the electrical energy storage system (3) being controlled by at least one control system (4) connected to said electric motor (10) and electrical energy storage system (3).

For the purposes of the present invention, the electric motor mentioned refers to an electric motor having a positive and negative actuation, with the positive actuation being the operation in the "electric motor" function, that is, the generation of mechanical energy from electrical energy stored in an electrical energy storage system (3); and the negative actuation being the operation in the "electric generator" function of the generation of electrical energy from mechanical energy for storage in an electrical energy storage system (3).

In one embodiment, the geometry of the system of auxiliary traction of the present invention is optimized to provide coupling on any shaft of the road implement, that is, it can be positioned from the first to the last shaft, with no restrictions on use or coupling. Furthermore, the system can be coupled to one or more shafts of the road implement, according to the need and/or demand, with no need for geometric changes to the implement, that is, the regenerative braking and electric traction management system can be coupled in implements with any shaft arrangements, whether these are dual-wheel shafts or not.

The electrical energy storage system (3), for the invention, is any element capable of storing electrical energy and operating in the charging and discharging functions, that is, being capable of being recharged and operating as a source of electrical energy. In one embodiment, the electrical energy storage system (3) comprises at least one battery or at least one ultra-capacitor. Said storage system (3) stores the energy dissipated in braking times and makes it available to the implement shaft as electrical energy for electrical traction in times of need for auxiliary traction.

The control system (4), in turn, is responsible for controlling the operations of the electric motor (10) and the storage system (3), the latter being where appropriate. For this end, the control system (4) is associated with a sensing system (9), wherein the operation of the electric motor (10) and the electrical energy storage system (3) is defined based on the responses provided by the sensing system (9). The control system (4) manages the traction or braking that the system applies to the implement shaft, guaranteeing the course, stability, and safety of the vehicle.

From this, the control system (4) is provided with a power management algorithm applied to the electric motor (10), to use the signals from the sensing system (9) to manage the traction or braking of the electrical activity/actuation of the system. In one embodiment, the sensing system (9) generates inputs for the power management algorithm to performs traction or regeneration actions according to the need for action. Thus, with the aid of the associated sensing system (9), the road implement, such as a semi-trailer, operates intelligently according to the signals received from the sensing system (9), in such a way that the control system (4), upon receiving the signals read by the sensing system (9), performs a control logic to generate actions previously defined in the road implement. In this sense, the control system (4) is designed as such the road implement operates intelligently and independently of the tractor vehicle, however, it is worth noting this operation does not make the road implement an autonomous vehicle, as there is a need to be coupled to a cargo vehicle.

In one embodiment, the control system (4) algorithm comprises at least the operation modes: i) electrical traction; ii) regenerative braking; and iii) free shaft. In a mode of i) electric traction, the algorithm can identify the need and the operation time of the electric motor (10) to the shaft supplying mechanical energy, after identifying the signals provided by the sensing system (9) and comparing these signals with pre-established parameters. In mode ii) regenerative braking, the algorithm identifies, by means of the signals provided by the sensing system (9), the need to set the system for operation in the function of the engine electric generator. Thus, comparing with the pre-established parameters, the algorithm enters this mode and starts charging the electrical energy storage system (3). In mode iii) free shaft, the algorithm can identify the need for "non-operation", that is, with the parameters within pre-established thresholds and/or by means of pre-defined rules, the system does not operate the electric motor (10). This mode is considered as the system security mode, such as when the algorithm identifies conditions that can generate risks (or unsafe conditions), the system does not activate the electric motor (10), leaving the road implement shaft operating normally. In addition, the mode iii) free shaft can be triggered by a user, enabling the security action of the system.

In one embodiment, the sensing system (9) comprises direct and/or indirect sensing, being comprised of at least one of: angular motion sensor, vector load sensor, brake use sensor, reverse gear sensor, wheel speed sensor, geolocation sensor, electric charge level sensor, or a combination of two or more thereof.

In one embodiment, direct sensing comprises sensors that perform a direct signal measurement, and the sensors that perform direct sensing are, for example, the angular motion sensor, the vector load sensor, the brake use sensor, and the reverse gear sensor.

In one embodiment, indirect sensing comprises sensors that perform an indirect signal measurement, and sensors that perform indirect sensing are, for example, the wheel speed sensor and geolocation sensor.

In one embodiment, the sensing system (9) operates in redundancy, that is, the sensing system (9) promotes greater operational safety for LCV, as well as following current safety standards, such as ISO 26262, and best practices in automotive industry.

In one embodiment, the angular motion sensor and the vector load sensor are positioned in a coupling system between the road implement and a tractor vehicle. In one embodiment, this coupling system comprises at least one-fifth wheel and kingpin intelligent type set.

In one embodiment, the angular motion and vector charging sensors are powered by an external source, that is, from the variation of the angular movements and vector forces of at least one direction of the coupling system, they produce a variation in the output signal.

In one embodiment, the wheel speed sensor is positioned on the wheel shaft of the road implement, such as to make it possible to measure speed thereof.

In one embodiment, the geolocation sensor comprises a sensor that transmits LCV location signals, having a function similar to, for example, a GPS. The signal transmitted by the geolocation sensor comprises the LCV location in the plane and of a selected route to be traveled, as well as altimetry signals of the route to be traveled.

In one embodiment, the brake use sensor comprises a sensor positioned on the implement brake system indicating to the control system (4) when the implement brake system is activated. In another embodiment, the brake use sensor is positioned to collect brake activation information from the tractor vehicle, since this information is already conventionally sent through the electric umbilical that communicates the tractor to the implement.

In one embodiment, the reverse gear sensor comprises a sensor positioned at the rear of the implement indicating to the control system (4) when reverse gear is engaged by the operator of the cargo vehicle. This sensor can capture information brought by the tractor vehicle's umbilical that communicates with the implement and can indicate the time when the driver activates the vehicle reverse gear.

In one embodiment, the electric charge level sensor is a sensor positioned in the electrical energy storage system (3) indicating the charge level stored in said system. Said sensor is capable of indicating the current charge status of the storage system (3). Additionally, this level sensor can operate by collecting electrical parameters from the storage system (3) and sending them to the control system (4), so that it can calculate the charge level (e.g., SoC) of the battery.

In one embodiment, a frequency inverter (2) is arranged between said storage system (3) and at least one electric motor (10). In one embodiment, the frequency inverter (2) has the function of transforming alternating currents into direct currents, and vice versa, in addition to monitoring various input parameters and applying the different operating modes of the system. In addition, said inverter (2) interfaces between the electric motor (10) and the electrical energy storage system (3). Said inverter (2) then allows the electrical energy storage system (3) to receive energy from regenerative braking and supply electrical energy to the electric motor (10) for traction of the shaft, then making the voltage adjustments and current.

In one embodiment, the control system (4) is embedded in the frequency inverter (2) for acting together with the power management algorithm. In one embodiment, the frequency inverter (2) operates in conjunction with the VCU (Vehicle Control Unit) of the semi-trailer, to perform the power management of the system.

As can be seen through the embodiments reported above, all sensors and signals used as parameters are embedded in the road implement itself. Based on this, the control system (4) algorithm takes into account the factor of these sensors for its operation, and one or more of these sensors can be used, defining an order of priority for the algorithm, thus making the system a safer operation. When considering the existence of all the sensors indicated above, control system (4) operates in an additive manner, that is, considering two or more parameters at the same time, or considering a parameter with a higher priority factor concerning the others. In one embodiment, the sensors used, in combination with the actuation of the power management algorithm, allow the road implement to be coupled to a tractor vehicle without requiring changes to the tractor vehicle.

For purposes of example, but not limiting the scope of the invention, the algorithm of control system (4) manages the applied power based on: the electrical charge level of the electrical energy storage system (3); the altimetry of the route to be traveled indicated by the geolocation sensor; on the slope of the highway; on the alignment sensor between the semi-trailer and the tractor truck; on the load sensor on the coupling; on wheel speed sensors, etc.

In one embodiment, the power management algorithm also manages the power demand by the management system for electrical actuation. Thus, the management made by the algorithm considers the signal from the electrical charge level sensor of the electrical energy storage system (3) which indicates the level of charge available for use in electric traction and/or how much charge it needs for full charging to be able to activate the regenerative braking.

Furthermore, in one embodiment, the management performed by the power management algorithm can also be additive or alternative, with the use of the geolocation sensor that signals the altimetry of the route to be traveled. Thus, if the power management algorithm identifies that in the route course ahead the implement may need more energy for electric traction, the algorithm automatically manages the use of the electric energy available in the electrical energy storage system (3) and directs/rations the energy of the storage system (3) to the times of greatest need for auxiliary traction.

In one embodiment, in the case of using reverse gear, the system of management for electrical actuation operates in the free shaft mode to avoid damage to the drivability of the vehicle-implement set. To this end, the reverse gear sensor signals the control system (4) that reverse gear is being used.

In one embodiment, the power management algorithm operates the function of ii) regenerative braking and the function of i) electrical traction of the system with no interference of an external operator, that is, the power management algorithm is an intelligent control system. In one embodiment, the user is allowed to disable these functions to provide greater safety for the set.

In one embodiment, the control system (4) comprises a VCU (Vehicle Control Unit) housing the power management algorithm and does the necessary data processing to information read from the sensing system (9) and the necessary decision making.

For the system of management for electrical actuation in road implements to operate and the control system (4) to manage all the parameters necessary for the operating modes, the control system (4) needs robustness and unrestricted compliance assurance with the operational safety requirements.

In one embodiment, the control system (4) does not allow mode i) electric traction to operate when the tractor or implement is in the braking process. In addition, it does not allow the mode i) electric traction to operate during maneuvers such as curves, low traction condition, etc., as well as ensuring that the system of management for electrical actuation is turned off in the event of sudden maneuvers. For this, the sensing system (9) guides and signals the control system (4) so that the power management algorithm does not allow actuation in the situations described, based on the measurement of the sensors. Furthermore, in mode i) electric traction, the control system (4) operates with controlled power such as the road implement never exerts a "push" force on the tractor vehicle, so that the road implement operates as a helper.

In addition, in one embodiment, the control system (4) does not allow it to enter into a mode of ii) regenerative braking during traction situations of the tractor vehicle or in situations in which the Long Combination Vehicle requires the free shaft mode.

Also, in one embodiment, the control system (4) ensures that the management system for electrical actuation operates in conditions wherein the angle between the tractor unit and the tractor unit is convenient to avoid the loss of drivability of the tractor vehicle, this angle is detected by the angular motion sensor.

In addition, the control system (4) allows the system of management for electrical actuation to be immediately deactivated in the event of a positive effort on the coupling system, based on the data from the angular motion sensor and the vector load sensor.

Thus, the present invention makes the tractor vehicle traction vector compatible with the implement traction vector to avoid safety problems of the vehicle-implement set, both in a straight line and in curves, wherein the implement operates as a helper for the tractor vehicle. For the safe operation of LCV, the implement never "pushes" the tractor vehicle. In this way, a LCV with the system of management for electrical actuation guarantees that the traction of the implement is auxiliary to the traction of the tractor vehicle. Therefore, for the safe operation of a LCV with the present invention, the auxiliary traction of the implement does not affect the directional attitude of the tractor vehicle or the vehicle-implement combination.

In these and other circumstances, especially when angles occur between the tractor vehicle and the implement, arise resulting vectors generating instability in the Long Combination Vehicles. The magnitude of this instability is proportional to the angle between the coupling of the tractor vehicle and the implement and to the difference in traction between the tractor vehicle and that provided by the road implement provided with auxiliary traction. The control system (4) then manages the operation based on data from all sensors in the sensing system (9) and, from this, prevents the occurrence of instability in the long combination vehicle.

In one embodiment, the sensors, cables, the VCU, etc., have a degree of protection that meets automotive requirements and standards, which allow them to act in an aggressive environment, such as, immersed in water, oil, dust, clay, vibration, etc.

In one embodiment, the control system (4) does not depend on information from the tractor vehicle CAN network, except for information already exchanged between the tractor vehicle and implement, such as the tractor vehicle brake signal or trigger of reverse gear.

In one embodiment, the system of management comprises at least one operation panel (5). In one embodiment, the operation panel (5) comprises a "human-machine interface (HMI)" wherein the operator/user chooses route parameters, such as the route intended to be traveled, for then the power management algorithm control the use and applicability of the electric traction mode and the regenerative braking mode aiming at greater energy gain, taking into account the characteristics of the selected route, such as altimetry, distance, etc., in addition to the signals from the electrical energy storage system (3), such as battery charge level, battery SoC, etc.

In one embodiment, the HMI is arranged in a location accessible to the driver inside the tractor vehicle cabin. The sensing system (9) and the control system (4) that are part of the HMI are arranged without using any type of cabling.

In one embodiment, the HMI allows manual configuration from the tractor vehicle driver if the vehicle operator allows the use of the manual option. In this way, the manual configuration enables the use of the system's electric traction mode, thus providing more mechanical power to the LCV under the driver's manual command. This manual function is only allowed when all the safety parameters measured by the sensing system (9) are being attended to, thus, the electric traction mode goes into operation. When it is not possible to use this manual function, the HMI informs the driver that it is not possible to use the manual function.

In one embodiment, the automatic operation of the system of management for electrical actuation can be changed to manual operation mode at any time the operator desires, except all safety parameters measured by the sensing system (9) are being met, i.e., the power management algorithm acts automatically, but manual operation overlaps with automatic so that the operator can actuate the electric traction mode and the regenerative braking mode when the power management algorithm does not trigger automatically, or when it is convenient, only when the sensing system (9) indicates total safety of activation of any of the operating modes.

In one embodiment, the control system (4) further comprises access to at least one data storage bank.

Also, in one embodiment, when the user indicates the route on the operation panel (5), there are two possibilities: the control system (4) indicates on the panel that the route is known, or the route is unknown. The power management algorithm of the control system (4) can identify a known route and the "ideal time" to activate the electric traction mode or the regenerative braking mode. Furthermore, for the purposes of understanding, "ideal time" comprises the optimization of the use of the electric traction mode or the regenerative braking mode of the system based on the route altimetry, with the power management algorithm being able to automatically choose for the use or not of the system in favor of the greatest possible reduction in fuel consumption. Also, in one embodiment, the operation panel (5) has a remote update allowing updating the map of known routes.

With this, the system of management of the present invention provides the electrical operations of traction and regenerative braking in the road implement in a safer way, from the information provided by the sensing system (9) and the parameters of the control system (4), evidencing and supplying demand from the current scenario. In addition, this system also makes it possible to: significantly reduce fuel consumption; reduce greenhouse gas emissions rates per kilometer traveled; increase vehicle lifespan; reduce the need to maintain the components of the tractor vehicle, since the system assists in traction in torque request times; reduce the requirement for said components; reduce of tire wear by distributing traction to more shafts; reduce the brake system requirement, reducing the thermal load on them, avoiding the reduction of the friction coefficient of its components, minimizing the fading effect; prevent overheating of the brake components resulting in an increase in its lifespan, for example, linings, drums, discs, and pads.

In a second object, the present invention shows a process of management for electrical actuation in road implements involving electric traction and regenerative braking, wherein the road implement is equipped with a system of management for electrical actuation comprising at least one electric motor (10) and at least one electrical energy storage system (3), the process comprising the steps of:
  a. identification of the slope ground degree wherein the road implement is traveled; and
  b. selection of operating mode, by means of a control system (4) comprised in the system of management, the selection is made based on at least the slope degree identified.

In one embodiment, the road implement is provided with a sensing system (9) constantly monitoring LCV conditions, such as, for example, it monitors speed, slope, application of the brakes, and similar. Said sensing system (9) is responsible for showing signs of the implement parameters so that the control system (4) can act. Thus, based on at least one previous parameter indicated, the control system (4) selects, by means of an algorithm, one of the possible operation modes, indicating the action that the system must perform.

In one embodiment, the operating modes selectable by the control system (4) are at least: i) electric traction; ii) regenerative braking; and iii) free shaft. In mode i) electric traction, the algorithm can identify the need and the operation time of the electric motor (10) to the shaft, supplying mechanical energy after identifying the signals provided by the sensing system (9) and comparing these signals with pre-established parameters. In mode ii) regenerative braking, the algorithm identifies, by means of the signals provided by the sensing system (9), the need to set the system for operation in the function of the engine electric generator. Thus, from the comparison with pre-established parameters, the algorithm enters this mode and starts charging the electrical energy storage system (3). In mode iii) free shaft, the algorithm is able to identify the need for "non-operation", that is, with the parameters within pre-established thresholds and/or by using pre-defined rules, the system does not operate the electric motor (10). This mode is considered as the system security mode, in such a way that when the algorithm identifies conditions that may generate risks (or unsafe conditions), the system does not activate the electric motor (10), allowing the shaft of the road implement operates normally.

In order to decision-making automatically, the algorithm must consider at least the ground slope degree that was identified. Thus, based on the detection of threshold values of previously defined degrees, the algorithm selects which of the operating modes it should select. In one embodiment, the slope degree of the implement is performed by a vector load sensor capable of identifying the slope of the section being traveled. For purposes of exemplification, in a situation of positive inclination or ramp, above a previously defined slope threshold, the algorithm activates the mode i) electric traction. In a situation of negative inclination or slope, above a previously defined slope threshold, the algorithm activates the mode of ii) regenerative braking. In case of a flat route or cases of ramp or slope within a minimum acceptable range, the algorithm activates the mode iii) free shaft.

In another embodiment, the identification of the ground slope degree is performed by a geolocation sensor communicating to a system previously fed with the route on which the LCV set is traveling, also containing the altimetric information of the route. With this, the geolocation system can inform the current position of the LCV and, from the altimetric information, indicate to the control system (4) the inclination of the current section. Based on this, the algorithm can choose the best times to select each of the operating modes. In one embodiment, route information and route altimetric information are contained in the operator panel (5).

Also, in one embodiment, when the user indicates the route on the operation panel (5), the control system (4) indicates on the panel whether the route is known or unknown. The power management algorithm of the control system (4) can identify a known route and the "ideal time" to activate the electric traction mode or the regenerative braking mode. Furthermore, for the purposes of understanding, "ideal time" comprises the optimization of the use of the electric traction mode or the regenerative braking mode of the system based on the route altimetry, with the power management algorithm being able to automatically choose for the use or not of the system in favor of the greatest possible reduction in fuel consumption. Moreover, in one embodiment, the operation panel (5) has a remote update allowing updating the map of known routes.

It should be noted that for the selection of operating modes the algorithm can use information from both sensors (vector load sensor and geolocation sensor communicating to a system previously fed with the route) or from each one individually. Additionally, it is noted that in both embodiments for the identification of the slope degree, there is the consideration of the ground slope degree threshold, wherein in the first case the sensor indicates the slope by means of the vector arrangement and, in the second, the sensor/system indicates the slope through the previously entered route.

In one embodiment, the control system (4) additionally selects the operating modes from a previously defined speed threshold and identified by means of at least one-speed sensor positioned on the wheel shaft of the road implement. The wheel speed detection of the implement operates with a complementary functionality, that is, adding to the other parameter detections and, from there, making the decisions for selecting modes. For purposes of example, with this functionality the system can guarantee that traction only occurs if the wheel speed is convenient, to signal that the vehicle is in motion. Also, from this parameter, it is possible to define a minimum speed for the mode i) electric traction to start operating, as well as to identify the speed reduction of the implement, to activate the mode ii) regenerative braking.

In one embodiment, the control system (4) additionally selects the operating modes from an angle threshold between the road implement and the tractor vehicle, to which the implement is coupled, the angulation being detected by means of at least one sensor angular motion. With this, the control system (4) increases the security of the power management system, preventing the electric motor (10) actuation from generating the jackknife effect. In addition, this function ensures that the time difference between the tractor unit and the traction unit is respected to avoid loss of drivability.

In one embodiment, the control system (4) further selects the operation modes considering the signal from the electrical charge level sensor of the electrical energy storage system (3), which indicates the level of charge available for use in electric traction and/or how much charge it is needed for full charging to be able to activate regenerative braking. Based on this, the algorithm considers the current state of the electrical energy storage system (3) to select the operating modes, avoiding the activation of regenerative braking at full charge or the activation of electric traction at low charge.

In one embodiment, the operating mode i) electric traction comprises a step of managing the power applied to the electric motor (10), based on results obtained by at least one vector load sensor and/or one electric charge level sensor. storage system (3). Said vector load sensor is responsible for, in addition to indicating slopes, provide information about the force vectors acing between the implement and the tractor vehicle, for example, acceleration and deceleration vector. From this, in mode i) electric traction, the control system (4) operates so that the tractor vehicle does not "push" through the coupled road implement. The mode i) electric traction of the system acts as an auxiliary, as it reduces the need for traction of the tractor vehicle. The application of the system in electric traction mode to at least one shaft of the road implement brings several benefits to the vehicle as a whole. At times when the system applies torque to assist in traction of the vehicle, efforts on the components of the tractor vehicle are reduced, thus extending its lifespan and reducing the need to maintain it, also reducing the rate of gas emissions, fuel consumption, and travel periods. The distribution of traction between more tires reduces tire wear and results in less damage to the road surface. For the purposes of the present invention, the applied power management refers to the amount of force applied by the electric motor (10) to the shaft, whether this force is positive or negative (negative, in the case of acting as a generator). Within the scope of the invention, power control is not limited solely and exclusively to electrical power, since it is related to the force applied by the electric motor (10), that is, this control can be done by varying the electrical voltage or current that feeds the motor.

Besides, the traction generated by the mode i) electric traction of the system allows the vehicle to develop a better running condition during times of high torque demand, for example, in slope situations, such as a mountain climb. This factor reduces the total travel time, allowing the carrier to be able to make a greater number of travels in the same period.

In one embodiment, the operating mode i) electric traction comprises a safety step of deactivating the electric motor (10), starting from the detection of brake activation, by means of at least one brake use sensor. In addition, the safety step defaults the mode i) electrical traction off, in such a way that the conditions identified by the sensors cause this mode to be activated, allowing its operation to take place with greater safety. In addition, the algorithm is configured so that any failure occurring during the system use, the electric traction must be turned off automatically and immediately. In one embodiment, this safety step assesses the charge conditions of the storage system (3), where if the charge is below a threshold, the electrical traction is disabled. In one embodiment, the safety step checks the ground slope degree, wherein if the vehicle is on a slope, the algorithm blocks any action for the use of electric traction. Additionally, in one embodiment, upon entering the safety mode, the control system (4) selects the mode iii) free shaft.

In case the control system (4), when verifying the data of the sensing system (9), identifies the need to select mode ii) regenerative braking, the system is configured to reuse the energy dissipated by the brake during braking, converting the dissipated energy into electrical energy and storing it in the electrical energy storage system (3) for later use in electrical traction in mode i) electrical traction. For purposes of example, mode ii) regenerative braking is selected when checking a ground slope condition and/or when checking the use of the brakes.

Thus, on selecting the mode ii) regenerative braking, the control system (4) operates to direct the electrical energy converted in the braking process to the electrical energy storage system (3). In one embodiment, this direction takes place through a frequency inverter, controlled by the control system (4).

In one embodiment, the control system (4) captures the data from the sensing system (9) and provides an analysis to determine the start of operation of the regenerative braking mode or of the electric traction mode applied to the implement shaft without causing the change of the route or loss of control over the vehicle by the pulled implement.

In one embodiment, the control system (4) considers, in its algorithm, the signals coming from all the sensors described above, in order to consider two or more parameters for the selection of the operating modes, so that the redundancy of the information is considered, enabling a higher safety level in the set operation.

In one embodiment, the operating modes can be triggered automatically by the power management algorithm or manually by the operator. The manual and automatic triggers operate together, in such a way that a priority safety scale of the trigger is defined, for example, the automatic trigger is a priority over the manual trigger, or the manual trigger is a priority over the automatic trigger. In one embodiment, the manual trigger is only allowed by the control system (4) when all safety parameters measured and properly signaled by the sensing system (9) indicate total safety to perform such activation. In one embodiment, the manual deactivation of the management system is a priority in the face of any action that can be taken by the control system (4), ensuring that a user can deactivate the system in the event of any emergency.

In a third object, the present invention presents an intelligent coupling system between road implement and tractor vehicle, wherein the road implement is equipped with a management system for electrical actuation comprising at least one electric motor (10) and at least one electrical energy storage system (3), the coupling system comprising at least one angular motion sensor and a vector load sensor communicating with a control system (4) of the implement's system of management.

In one embodiment, the coupling system comprises a kingpin positioned on the road implement engaging in a fifth wheel positioned on the tractor vehicle.

In one embodiment, the fifth wheel and/or the kingpin are equipped with at least one angular motion sensor and at least one vector load sensor, which provides the mapping of the movement data of the coupling system between the tractor vehicle and the implement, or between the fifth wheel and the kingpin.

In one embodiment, the angular motion sensors and the vector load sensors are positioned on the fifth wheel of the tractor vehicle. In one embodiment, the angular motion sensor is positioned on the kingpin and the vector load sensor is positioned on the fifth wheel. In one embodiment, both said sensors are positioned on the kingpin. In one embodiment, the angular motion sensor is positioned on the fifth wheel and the vector load sensor is positioned on the kingpin.

In the Long Combination Vehicle (LCV), in acceleration situations, the electric traction mode of the system acts in such a way that the traction vector between the fifth wheel and the kingpin is kept oriented in the direction of movement and parallel to the central shaft of the LCV. This is done by understanding the steering tolerance, to provide the road route copy, that is, there is a traction of the implement. Thus, the technology ensures that the tractor vehicle does not "push", that is, it guarantees that the road implement always maintains a synchronized regime of reduction of the traction vector, implying a reduction in the need for traction of the tractor. In this sense, the system electric traction mode of the present invention acts as an auxiliary, in such a way the road implement does not push the tractor vehicle, avoiding generating the "jackknife" effect, or as known, the knife or L effects. In braking situations, the resulting efforts on the kingpin can reverse direction, but with no impairing the vehicle's drivability.

In one embodiment, the coupling system additionally comprises other monitoring points to assist the management system in defining an inertial sensor in the implement and/or means to signal the behavior of the coupled implement(s). In one embodiment, signals from the brake pedal are used to turn off the traction of the system of management.

It is an object of the present invention, a system of management for electrical actuation in road implements, involving electric traction and regenerative braking, comprising a control system (4) communicating with an operation panel (5), wherein the operation panel (5) it is provided with at least one route for the traffic of the road implement, the said route containing data of the altimetric profile of the route, wherein: the control system (4), provided with an algorithm, selects operating modes from the profile data altimetric of the route, the modes of operation being at least one between i) electric traction, ii) regenerative braking, iii) free shaft, or a combination thereof.

The route to be traveled by the tractor vehicle and road implement is previously defined by an operator/user, wherein in this route the altimetric profile data is acquired through the information contained in the database, information via satellite, information via aerial images, information raised locally and manually, etc. Based on this, it is possible to check the points where there are more parts of the ramp, slope, and planes along the route. Thus, when accessing this information, the control system (4), through a previously configured algorithm, decides to select which of the operating modes the system of management should use.

The system of management comprises an electrical energy storage system (3) communicating with an electric motor (10) that interacts with the shaft of the road implement. In one embodiment, the system of management comprises at least one electrical charge level sensor positioned in the storage system (3), capable of indicating the amount of charge present in the said system (3).

Thus, in one embodiment, the control system (4) considers in its algorithm the altimetric profile data and the charge quantity of the storage system (3), in order to propose management of the electric energy to be used in the set and, consequently, better optimization of fuel consumption. During operation, the control system (4) guides the actuation of the modes of electric traction, regenerative braking, or free shaft, according to the need for operation from the current location signals of the set provided by the geolocation sensor.

In this sense, for exemplification, the control system (4), based on the altimetry information considered to be predictive, can identify whether the current ramp has a less steep ramp than the subsequent ramp, to choose the selection i) electric traction only on the next ramp. In one embodiment, the control system algorithm considers a relationship between the route altimetry and the charge level of the storage system (3). From the parameters of this relationship, the algorithm is able to select the operating modes accordingly. Additionally, in one embodiment, a previous calculation is made of the number of ramp parts, and the respective distances, and the number of ramp parts, and the respective distances, which are present in the route to be traveled. Thus, considering the charge×discharge ratios of the storage system (3) (previously known), the algorithm can approximately predict the charge state of the system (3) at the end of the route. Thus, depending on this result, the algorithm can identify the most ideal times for the application of the mode i) electric traction, which can only be on the ramps with the highest inclination and/or the longest extension.

The application of the said system in road implements results in several advantages for the combination and the transport operation, such as a significant reduction in fuel consumption, in addition to the management of the battery charge used in the system, providing an intelligent battery consumption in the electrical actuation system of the road implement.

The examples described below illustrate some of the ways of performing the invention, but it should not be construed as limiting.

Example 1—Electric Traction and Regenerative Braking Management System on Road Implement The examples shown herein are intended only to exemplify one of the several ways of performing the invention, however with no limiting the scope of the invention.

For an exemplification of the concept of the invention, several initial assumptions were considered, which emphasize the system safety, as well as aiming at the best-operating conditions to reduce fuel consumption and increase the component lifespan. Such assumptions refer to: the development of the control system so that the road implement is coupled to a tractor vehicle without the need for changes to it; implementation of indirect sensing, mainly so that there is security redundancy in the system; the control system (algorithm) is designed so that the semi-trailer (implement) can operate independently of the tractor vehicle; all sensors and signals used as a control parameter must be necessarily on board the semi-trailer.

In addition, the algorithm must be responsible for the operation of the auxiliary traction system, as well as the regenerative braking mode, without the interference of an external operator, under the following conditions: a) In flat parts or with positive inclination (ramps) the system must operate only in tractive mode (never regenerative), according to battery parameters allowing its use, convenient road inclination and with the tractor vehicle in traction mode (advancing); b) On negative inclinations (slopes), where it is necessary to reduce or maintain speed, the system must operate in regenerative mode, according to battery parameters allowing the charge of it, convenient road inclination and with the vehicle tractor in braking mode; c) In flat parts, the system must operate in "freewheeling" mode, without generating restrictions or even tractive assistance; d) In the case of reverse gear, the system must operate in "freewheeling" mode, to avoid deviations in the set drivability.

Given this, a system of management was designed with the control system (4) developed with an algorithm operating from the responses of the sensing system (9). For this, the sensing system (9) was designed to contain direct sensing and indirect sensing (redundant), consisting of: angular motion sensor, vector load sensor, motion sensor, brake use sensor, reverse gear sensor, wheel speed sensor, geolocation sensor, and electric charge level sensor. All sensors were positioned on the semi-trailer, to ensure that no changes had been necessary to the tractor vehicle.

Thus, on flat road parts or with a positive inclination, that is, in a ramp situation, the system of management for electrical actuation operates in the electric traction mode, but never in the regenerative braking mode. In electric traction mode, the system operates according to parameters of the electric charge level sensor, that is, if there is electrical energy available in the storage system (3) for use in electric traction, as well as considering the inclination of the ramp 0% of the road, that is, the traction operates in a flat condition or on a positive inclination. In this way, the sensing system (9) guides the power management algorithm about the positive inclination of the road or flat part and, from there, the algorithm activates the electric motor (10) which tractions the implement shaft with electrical energy stored. In this sense, the algorithm was designed in such a way that the electric traction mode is activated only on a ramp or on a flat part.

On-road part with negative inclinations, that is, on parts of slopes, where it is necessary to reduce or maintain speed, the system of management for electrical actuation operates in regenerative braking mode, according to the parameters from the level sensor electrical charge of the electrical energy storage system (3), so this can be charged, as well as considering the slope below 0 of the road. Also, from the sensors and redundancy routines that the system operates, the control system (4) selects the regenerative braking mode considering the degree of negative inclination and the distance of the part in these conditions, to determine the potential for regeneration. In this way, when activating the regenerative braking mode, the braking energy is reused to supply the electrical energy storage system (3).

In flat parts of the road, the system of management for electrical actuation operates in the free shaft mode, which comprises how no restrictions on the implement are generated, nor tractive aid. For this, the sensing system (9) identifies that there is no demand for auxiliary traction and there are no braking moments for the regenerative mode to be activated. However, even on flat parts, electric traction can be activated.

In addition, the control system (4) algorithm is configured in such a way as not to allow the mode i) electric traction to act during maneuvers such as curves, low traction condition, etc., as well as ensuring that the system of management for electrical actuation is switched off in the event of sudden maneuvers. Furthermore, in mode i) electric traction, the control system (4) operates with controlled power in such a way that the road implement never exerts a "push" force on the tractor vehicle, wherein the road implement operates as a helper. For this, if the angular motion sensor and/or the vector charge sensor detect positive effort in the coupling system between the implement and the tractor vehicle, the system of management for electrical actuation is immediately deactivated.

In addition, the control system (4) allows the system of management for electrical actuation to act as a traction assistant in the event of the need for auxiliary power to start in ramp situations to prevent LCV setbacks. To this end, the vector load sensor signals to the power management algorithm that LCV is in a ramp situation and activates the electric traction mode. Besides, the control system (4) allows that, in ramp situations, the regenerative braking mode should never be activated, even when the brake system is operating. Thus, the vector load sensor identifies and signals to the power management algorithm that LCV is on a ramp and, therefore, needs traction.

The control system (4) also allows the electric traction mode to be activated only if the wheel speed is above 0, being convenient to signal that the tractor vehicle is moving forward, using, in this case, the data of the implement wheel speed sensor.

Additionally, the control system (4) algorithm does not allow the selection of the mode of ii) regenerative braking during traction situations of the tractor vehicle or in situations in which the Long Combination Vehicle requires the free shaft mode. For this end, the vector charge sensor identifies whether the LCV is on a ramp part, with the power management algorithm activating the electric traction mode, or if the LCV is on a flat part, with the power management algorithm activating the free shaft mode. Furthermore, the speed sensor and the angular motion sensor help to identify that the LCV is in a maneuver condition and, therefore, the mode iii) shaft free must be kept. Even so, the control system (4) can allow the regenerative braking mode to act, at certain angles of action, regardless of the brake use since the tractor vehicle may have other resources to initiate a descent.

Figure 6:
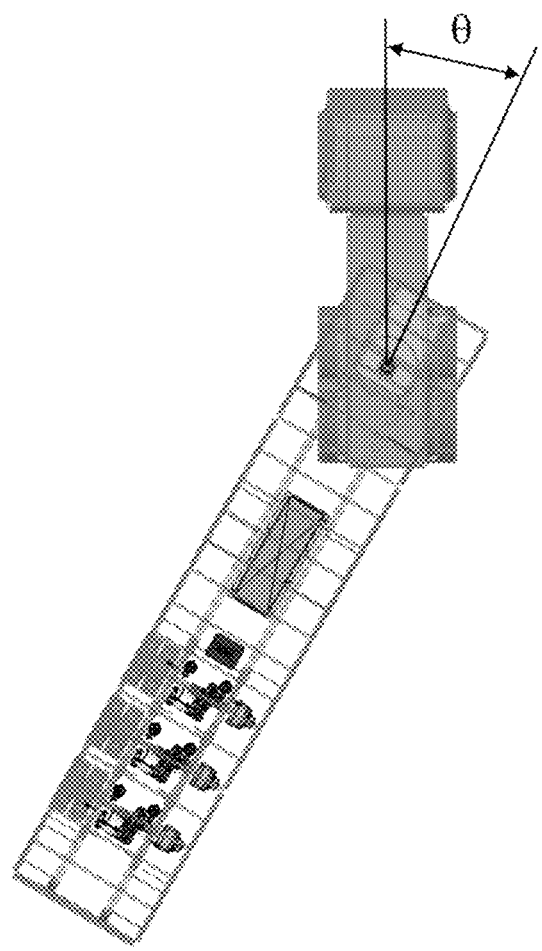
FIG. 6 shows a schematic of a road implement coupled to a tractor vehicle to show an angle range e between the road implement and the reference shaft of the tractor vehicle, considered safe for the actuation of the system of management.

To avoid the jackknife effect, or any application of undue force at the moment when the tractor vehicle is at an angle concerning the semi-trailer, avoiding the loss of the vehicle drivability, the algorithm is configured to select the mode i) electric traction for different angles between the LCV units, however, at any time the relative angle between the units (tractor and tractor) cannot generate dynamic influence capable of changing the combination drivability, based on the parameters of the other systems, sensors and set controls. Angles from 0 to 60° (for left and right) are covered in the automatic system managed by the algorithm. The system may be demanding to operate with values greater than 60 degrees, however, in this case, the system requires manual activation. In this way, as can be seen in FIG. 6, angle θ exemplifies a safe range of actuation concerning the reference shaft of the tractor vehicle, allowing the system to act as a helper even in curve situations on-ramp. The system ensures that dynamic conditions of curves and shaft drag are considered so that the safety of the set is kept.

In addition, in the case of using reverse gear, the system of management for electrical actuation operates in the free shaft mode to avoid damage to the drivability of the vehicle-implement set. To this end, the reverse gear sensor signals the control system (4) that reverse gear is being used. Alternatively, the indication that the tractor vehicle has engaged reverse gear is identified by means of the umbilical that conventionally interconnects the tractor vehicle and the semi-trailer.

As previously mentioned, the algorithm also considers the signal from the electrical charge level sensor of the electrical energy storage system (3) which indicates the charge level available for use in electrical traction and/or how much charge it needs for full charging to be able to activate the regenerative braking. In addition, the charge level conditions are indicated to the user, so that he can be aware of the current state of the battery.

In another design assumption, the control system (4) was configured to allow in case the ABS brake system needs to be actuated, the system of management for electrical actuation stops acting immediately, based on the wheel speed sensor data and implement use brake sensor. In addition, the control system (4) does not interfere with the operation of the ABS brake system or any other vehicle safety system. Moreover, in the case of the operation of any auxiliary safety system (ABS, EBS, ESC), the control system (4) stops the actuation of the system of management, leaving the assembly in free shaft mode.

Additionally, the algorithm considers the information of the route on which the vehicle is traveling, where a user indicates through a panel of operations the route to be traveled by the vehicle, citing a starting point and an ending point and the path between these two points. This route information also contains the altimeter profile data for the part. Thus, based on this altimetric profile and the signals sent by the geolocation sensor, which indicates the current position of the vehicle, the control system (4) algorithm is able to identify the existence of ramps and slopes. Furthermore, with access to this predictive information, the control algorithm is able to indicate the ideal time for selecting the modes. For example, even if a ramp situation is detected, the control system (4), from the altimetric profile, knows the current ramp does not have a very steep inclination and that it would be more viable to wait for the next ramp situation, which is steeper than the first, to activate the electric traction mode. With this, the control system (4) can choose along the route to rationalize the power applied to the motor, to preserve the energy stored in the battery. It should be noted that this ground condition is extremely normal in countries with a geographic profile endowed with landform, such as Brazil. If there is a loss of signal from the geolocation sensor, that is, there is a loss of GPS signal for a few minutes during route operation, the signal loss is not perceived by the driver and the impact of said loss is negligible for the energy performance of the management system of regenerative braking and electric traction.

For this function, the route data can be added to a database, which the system of management has access. With that, the new routes can be stored in the database for later use. Additionally, when finishing a route, the database is updated with the data obtained along the route, also indicating the points at which the control system (4) chose to select the operating modes automatically, in addition to indicating if and when there was user intervention, by means of manual operation. The mapped routes are compatible with any combination of tractor and implement and are shareable with other users of the system.

To enter route information, the user uses the operations panel (5), where this panel comprises an HMI in which the user can also view the operating parameters of the system of management. Also, through this HMI, the user can manually select the operating modes of the control system (4), since all the safety parameters measured and properly signaled by the sensing system (9) indicate total security to perform such activation. In addition, as a security command, through the HMI the user has a tool to manually deactivate any operation of the system of management, where this option has a higher degree of priority (in terms of software architecture) concerning any other system action. Moreover, a log can be recorded with the information of the automatic or manual operation of the system.

Figure 51:
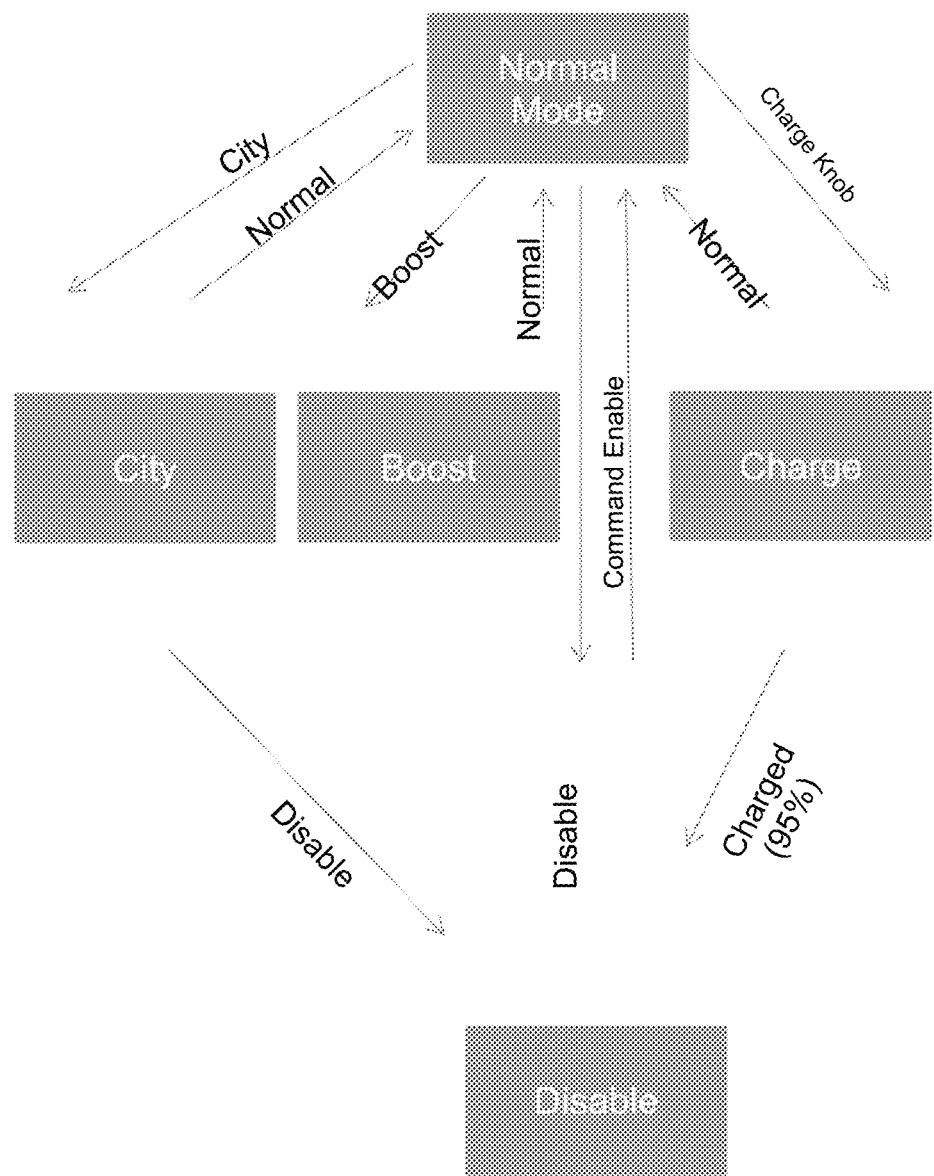
FIG. 51 shows an example of a possible architecture for the operating and driving modes of the system.

The HMI can also be configured with specific modes for each user, for example, for a fleet owner or driver. Based on this, it is possible to configure operations according to the need for action. In FIG. 51, which shows one of the many architectural possibilities of the system, the "normal", "city", "boost", "charge" and "disabled" modes are available. In this possible architecture, a layered control system is shown, in which the Pilotage layer is more internal and runs whenever the system is active, that is, it just does not run in the "disable" mode. Piloting is just a block from the Navigation layer. GPS feedback should only occur on known, predefined routes. In other routes/situations, the system must be set to one of the chosen modes (normal, city, boost).

Example 2—Long Combination Vehicle Provided with Safe Electric Traction and Regenerative Braking Management System Electrical traction and regenerative braking management system were produced on-road implements. Said system has an electric motor (10) and an electrical energy storage system (3), controlled by a control system (4), wherein the control system (4) is associated with a sensing system (9), where the operation of the electric motor (10) and the electrical energy storage system (3) is performed based on signals from the sensing system (9).

The electrical energy storage system (3) consists of an arrangement of several battery cells.

FIG. 1 shows the system of management for electric traction and regenerative braking on road implements applied to a LCV. Said FIG. 1 illustrates the location of the system components, as well as showing an example of operation in ramp situations. The sensing system (9), as indicated in FIG. 1, comprises the set of sensors performing the sensing. The sensors are positioned in the coupling system, in the electrical energy storage system (3), in the wheel shaft (1), in the control system (4), and at the rear of the road implement.

Also, as indicated in FIG. 1, in ramp situations, the direction of the energy flow is as indicated in (8), that is, the helper function of the system is acting to assist in traction. In this situation, electrical energy flows from the battery set (3), the current is converted into the inverter (2), which makes it available to the electric motor (10) and it interacts with the shaft (1). The rotation direction of the shaft (1) in the helper function is as indicated in (6). The current from the battery set (3) is conducted to the electric motor (10) by means of electrical conductors (7).

In addition, FIG. 1 shows the operation panel (5) located on the tractor vehicle. The operation panel (5) is a human-machine interface (HMI) arranged in a location accessible to the driver inside the tractor vehicle cabin.

Figure 2:
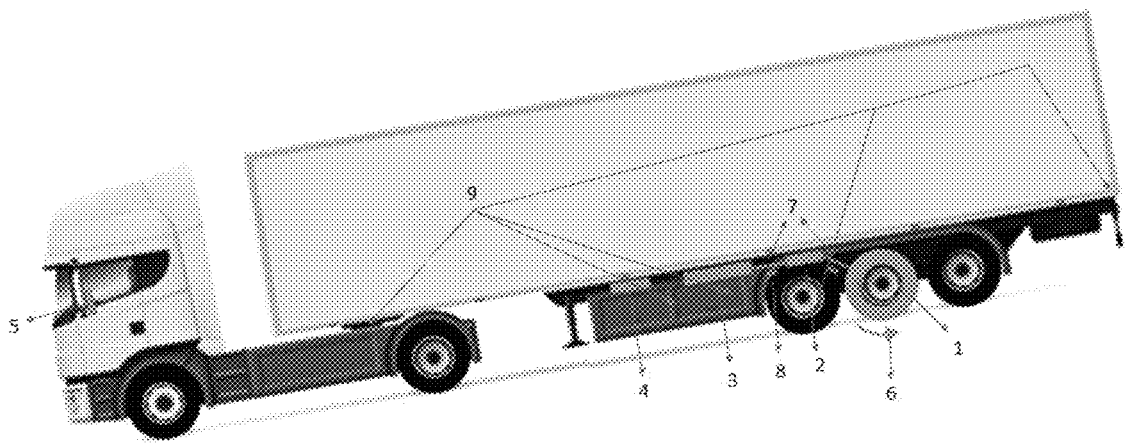
FIG. 2 shows an embodiment of the system of management of the present invention applied to a road implement under a slope.

FIG. 2, in the same way as illustrated in FIG. 1, shows the location of the system components, as well as showing an example of operation in slope situations.

Also, as indicated in FIG. 2, in slope situations, the direction of the energy flow is as indicated in (8), that is, the regenerative braking function of the system is acting to charge the battery set (3). In this situation, the energy dissipated on the shaft (1) is captured, converted by the inverter (2), and directed to be stored in the battery set (3). The rotation direction of the shaft (1) in the regenerative braking function is as indicated in (6). The energy dissipated in the shaft (1) is conducted to the frequency inverter (2) by means of electrical conductors (7), as well as it is conducted from the frequency inverter (2) to the battery pack (3), also, through of electrical conductors (7).

Figure 3:
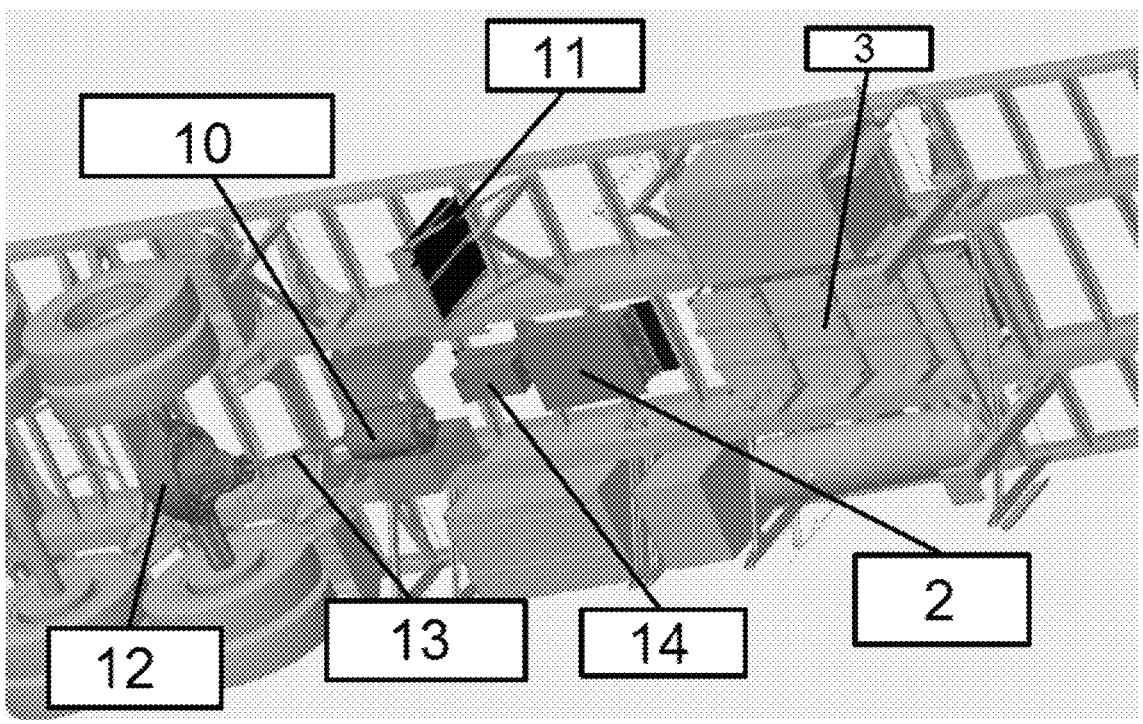
FIG. 3 shows a bottom view of a road implement provided with an embodiment of the system of management of the present invention.

FIG. 3 shows a bottom view of an example of the application and arrangement of the system of management for electrical actuation in road implements, wherein the electric motor (10) interacts with one of the implement shafts. A cooling system (11) dissipates the heat from the electric motor (10) and the frequency inverter (2). An auxiliary box (14) encompasses the control system (4) and connects to the frequency inverter (2). In addition, the system has an insulated Cardan shaft (13) that makes the connection between the electric motor (10) and a differential shaft with reduction (12). Further, the electric motor (10) is directly associated with the differential shaft with reduction (12) or shaft (1) of the road implement, without using the Cardan shaft (13).

Figure 4:
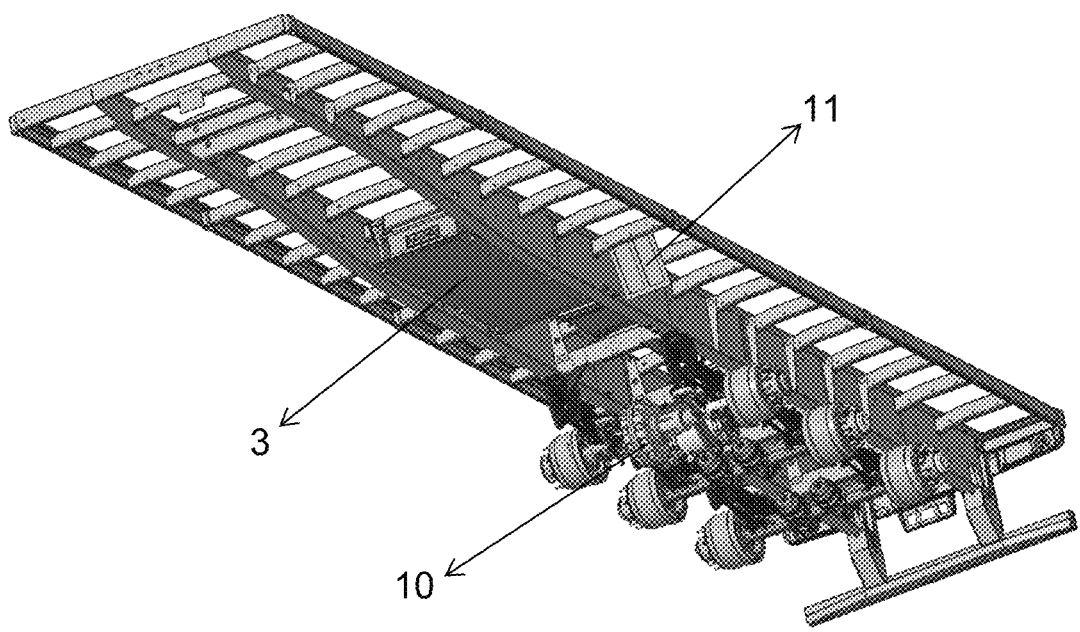
FIG. 4 shows a bottom perspective view of a three-shaft road implement provided with an embodiment of the system of management of the present invention.

FIG. 4 shows a bottom view of an example of the electric traction and regenerative braking management system applied to a three-shaft road implement. In this embodiment, the system was applied to the first shaft of the implement.

Figure 5:
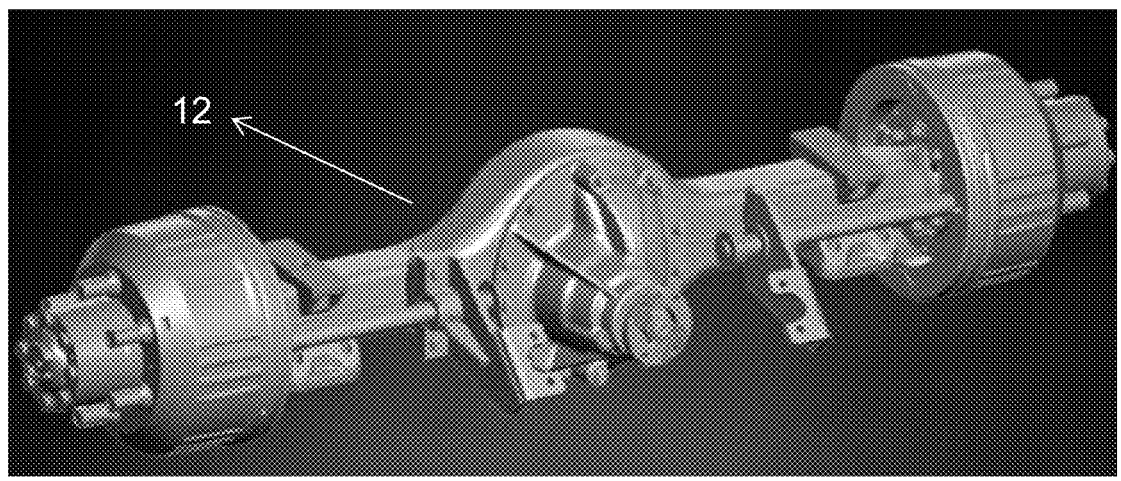
FIG. 5 shows an embodiment of a differential shaft with reduction (12) used and one of the system embodiments.

FIG. 5 shows an embodiment of the differential shaft with reduction (12).

FIG. 6 shows the safe e angle between the tractor unit and the traction unit, which comprises the safe angle of implement operation concerning the reference shaft of the tractor vehicle. This angle ensures the safety of the LCV so that there is no vehicle drivability loss.

Figure 7:
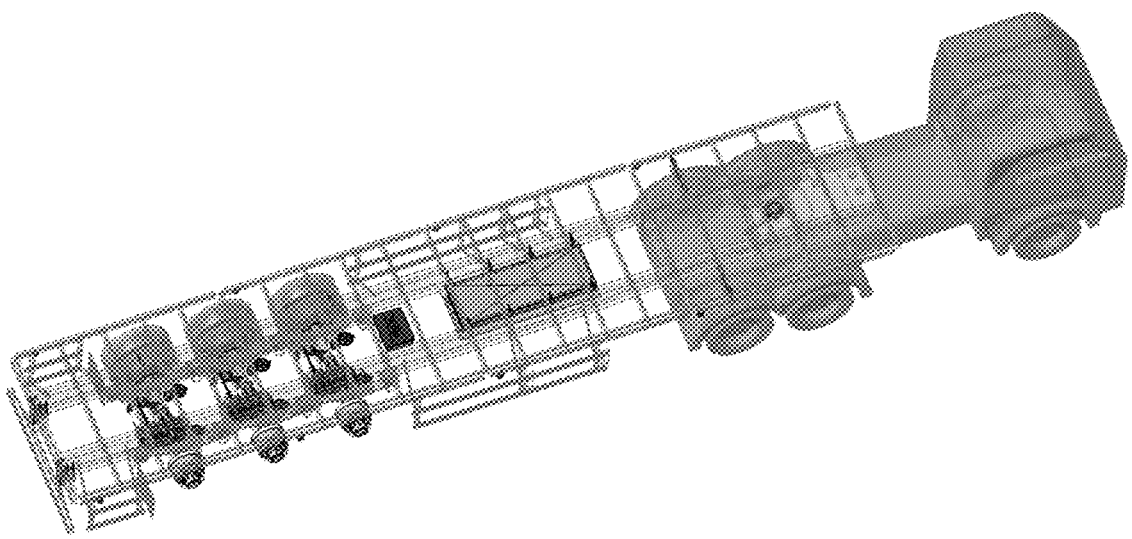
FIG. 7 shows a perspective view of a three-shaft road implement coupled to a tractor vehicle, with the implement being equipped with an embodiment of the system of management of the present invention.
Figure 8:
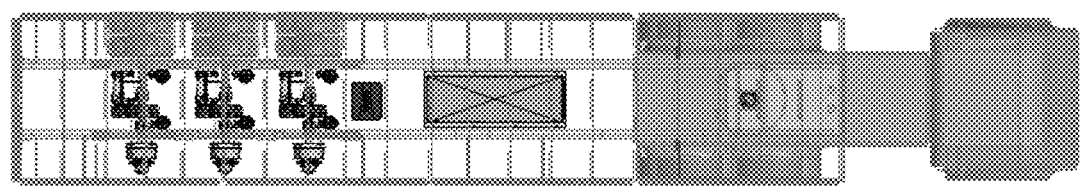
FIG. 8 shows a top view, according to FIG. 7, of the road implement coupled to a tractor vehicle, the implement being equipped with an embodiment of the system of management of the present invention.
Figure 9:
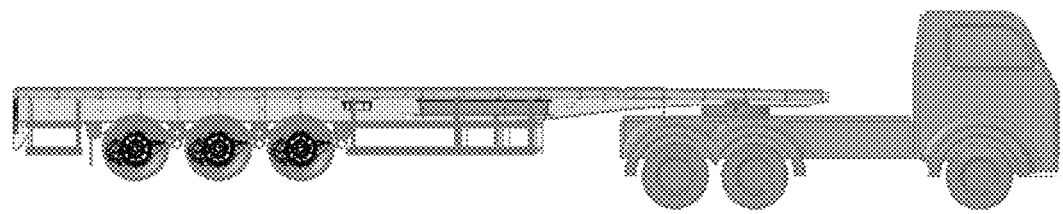
FIG. 9 shows a side view of the implement according to FIGS. 7 and 8.

FIG. 7 shows a perspective view of the present invention applied to the three shafts of a three-shaft road implement. FIG. 8 shows a top view of the embodiment shown in FIG. 7. FIG. 9 shows a front view of the embodiment shown in FIGS. 7 and 8.

Figure 10:
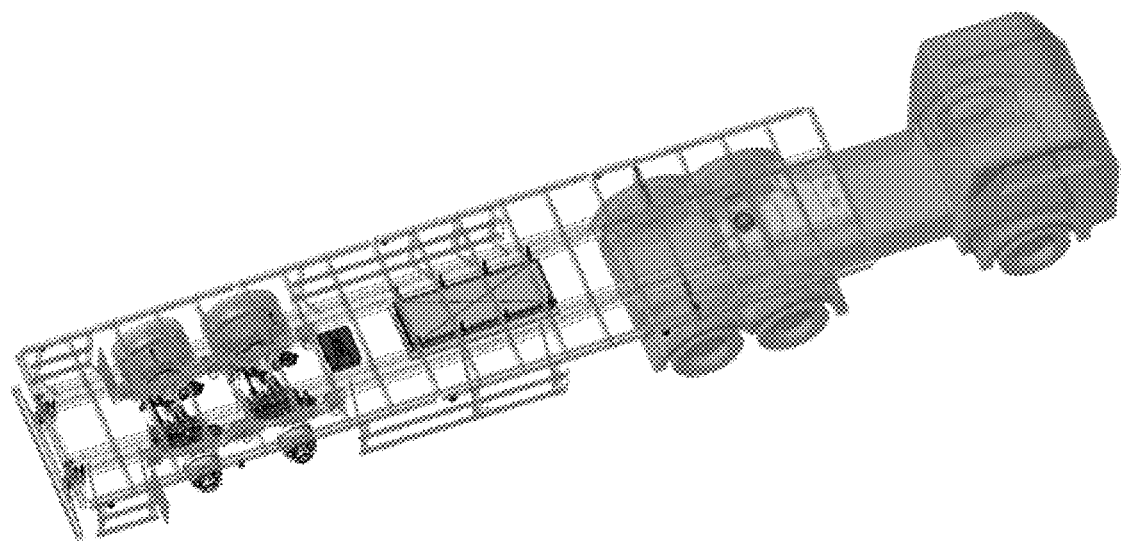
FIG. 10 shows a perspective view of an embodiment of the present invention applied to the two shafts of a road two-shafts implement.
Figure 11:
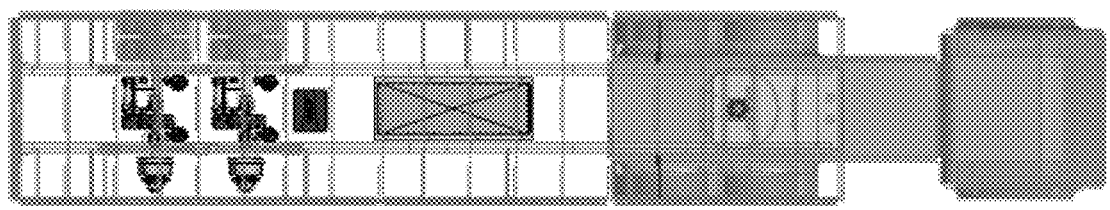
FIG. 11 shows a top view of the embodiment shown in FIG. 10.
Figure 12:
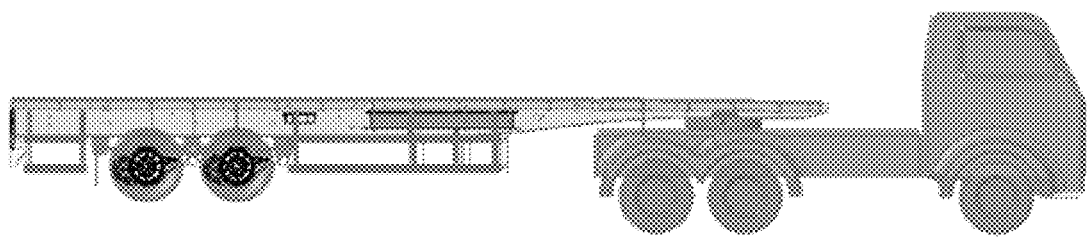
FIG. 12 shows a front view of the embodiment shown in FIGS. 10 and 11.
Figure 13:
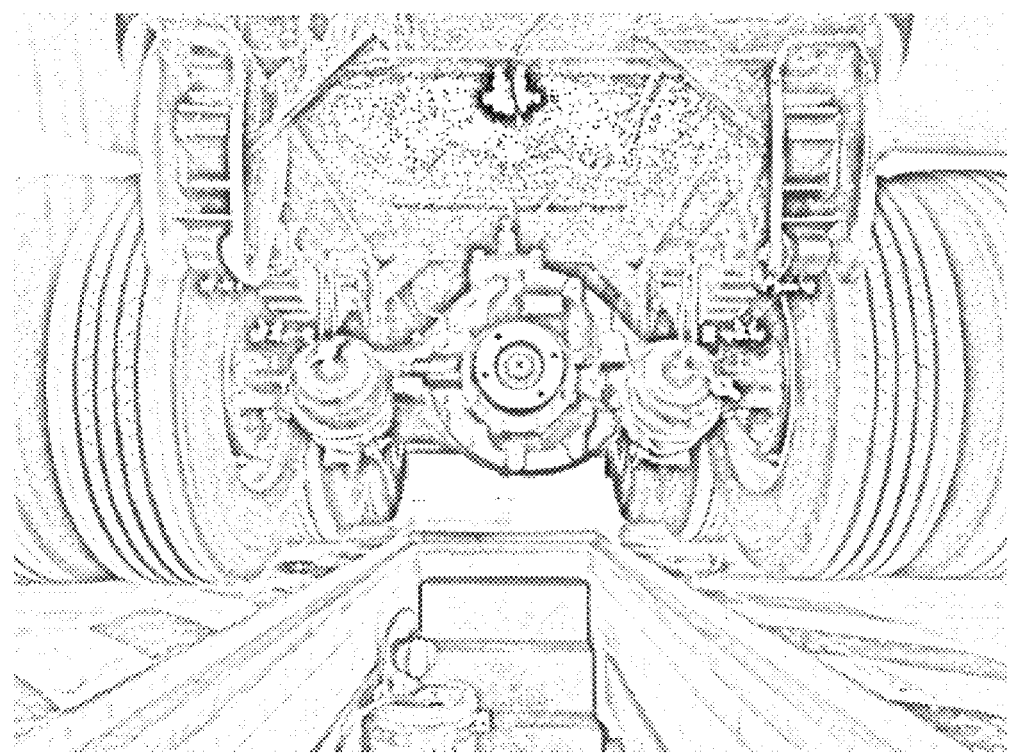
FIGS. 13 to 20 show an exemplary image sequence of the assembly of the system of management of the present invention in a road implement to emphasize the positioning of the driving shaft of the road implement, as well as the interaction between the electric motor (10) and the shaft.
Figure 14:
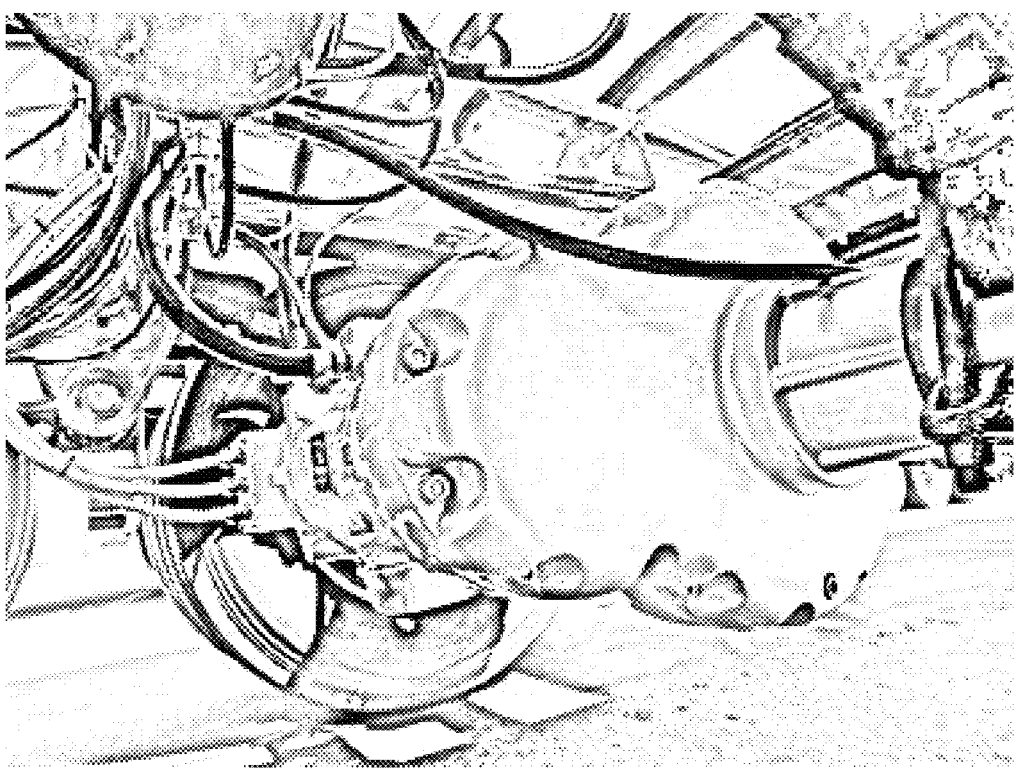
Figure 15:
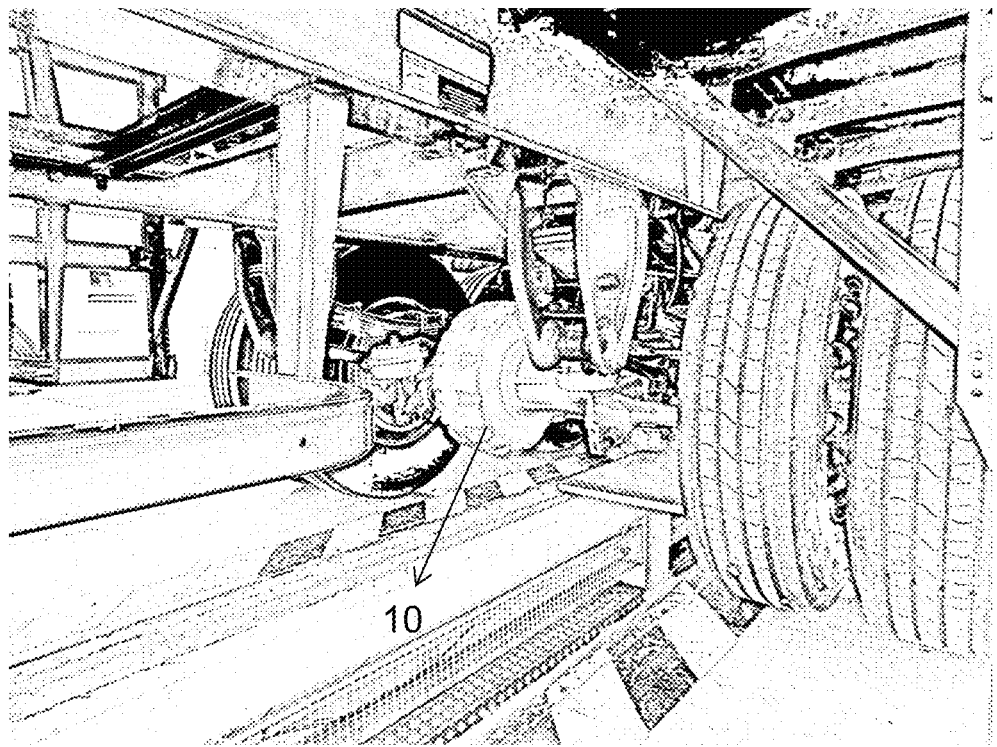
Figure 16:
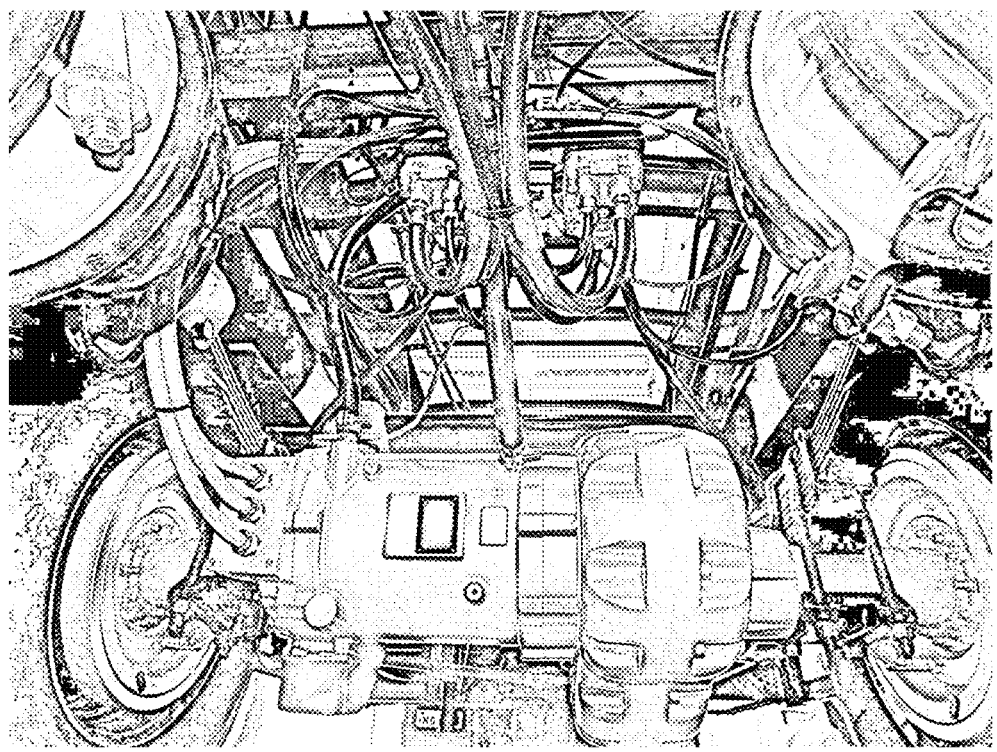
Figure 17:
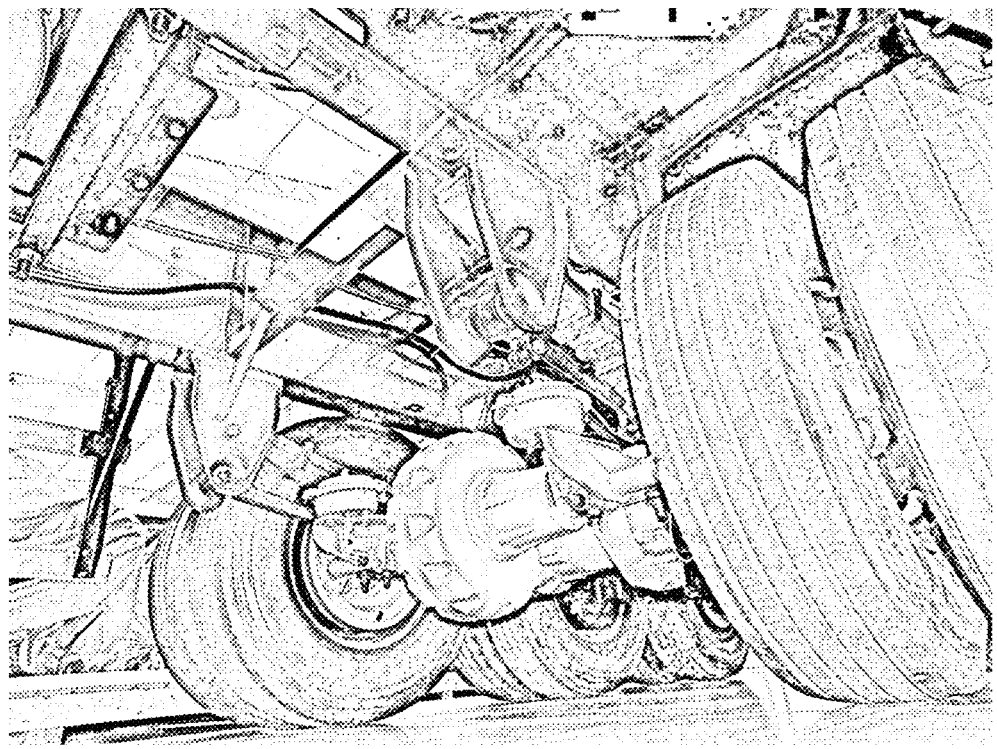
Figure 18:
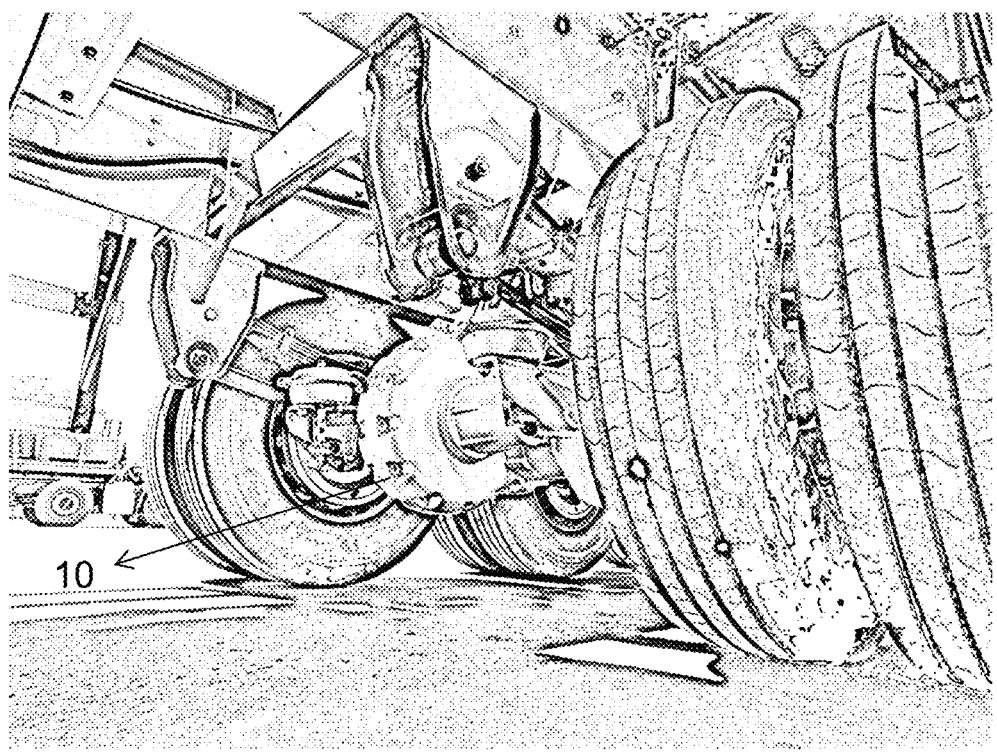
Figure 19:
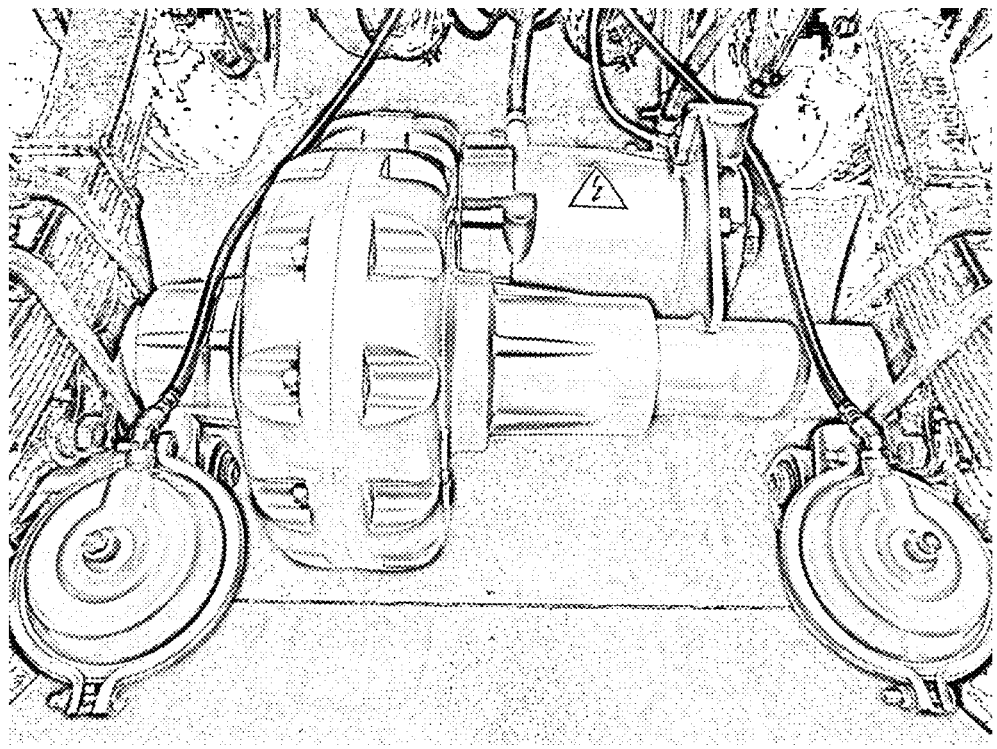
Figure 20:
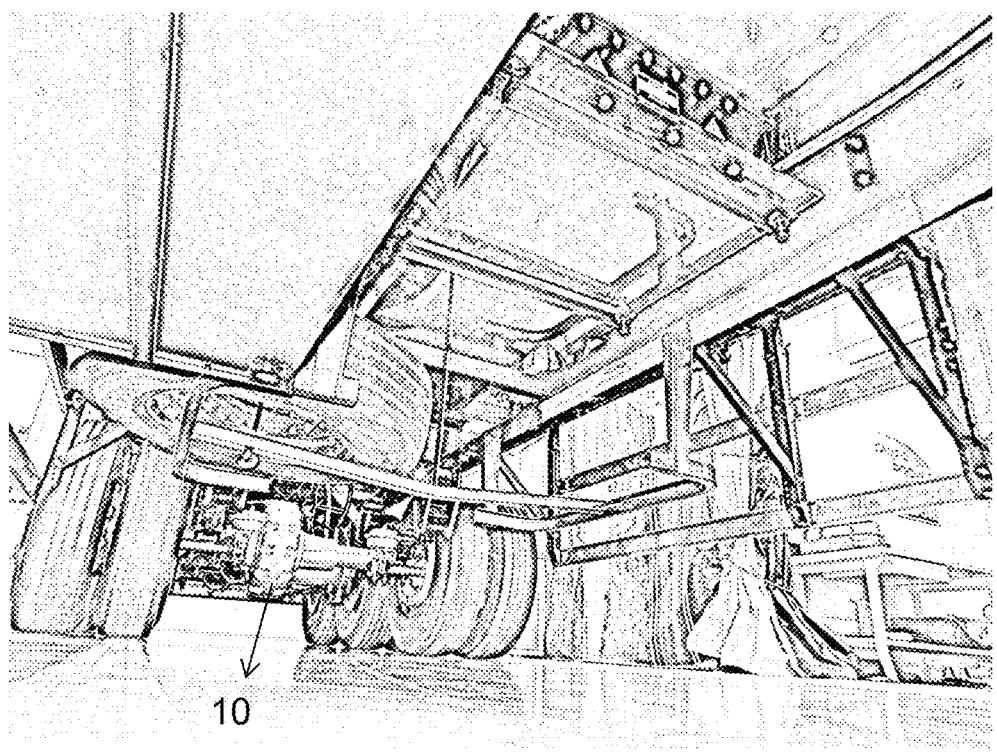

FIG. 10 shows a perspective view of the present invention applied to two shafts of a two-shafts road implement. FIG. 11 shows a top view of the embodiment shown in FIG. 10. FIG. 12 shows a front view of the embodiment shown in FIGS. 10 and 11. From the figures indicated, it is clear that the electric motor (10) can interact with any combination of road implement shafts, that is, using interaction with one or more shafts, which can be any of the implement shafts.

FIGS. 13 to 20 show embodiments for applications of the electric traction and regenerative braking management systems arranged in a road implement, showing that the said system has optimized geometry and embodiment so that it is possible to fit it safely in any type of road implement, with no need for structural changes to the implement, which could compromise the safety of using the system.

Figure 21:
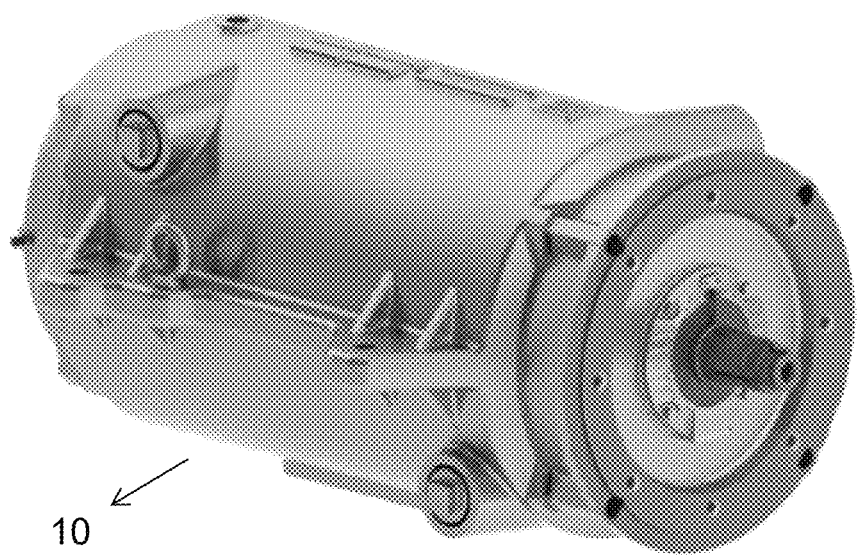
FIG. 21 shows an embodiment of the electric motor (10) of the present invention.
Figure 22:
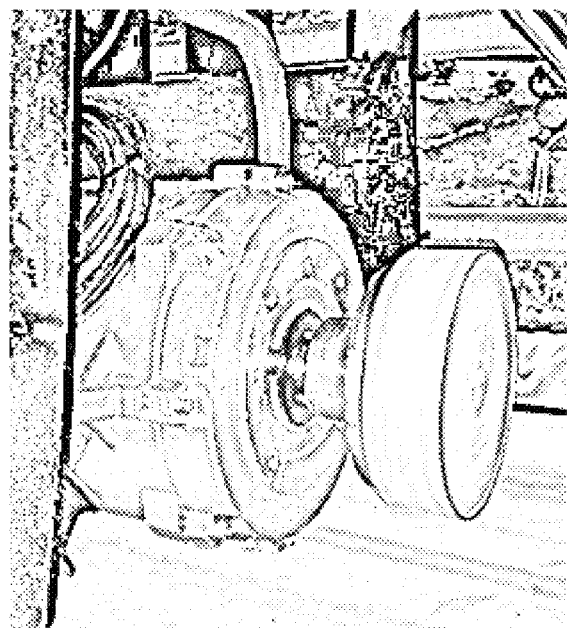
FIG. 22 shows an exemplary application of the electric motor (10) of the present invention.

FIG. 21 shows an embodiment of the electric motor (10) and FIG. 22 shows an example of the application of the electric motor (10) in a road implement.

Figure 23:
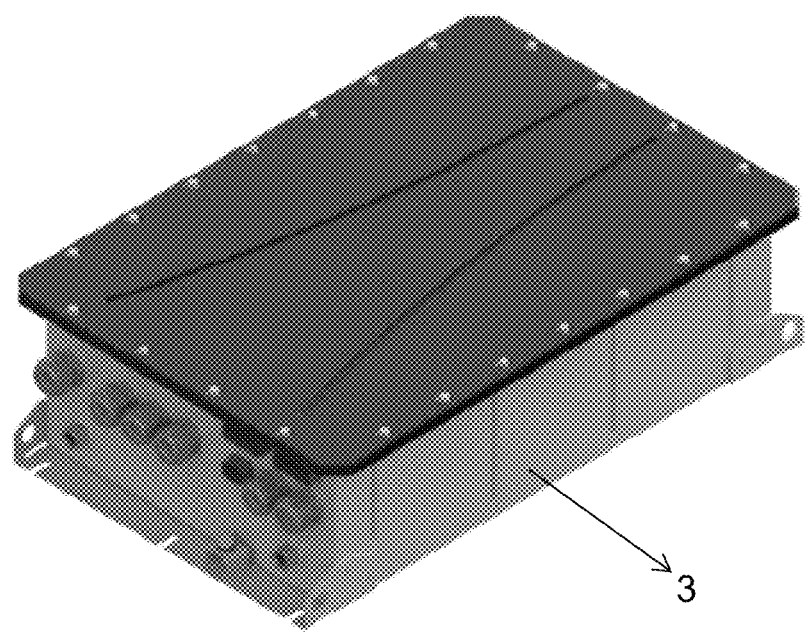
FIG. 23 shows an embodiment of the electrical energy storage system (3).
Figure 24:
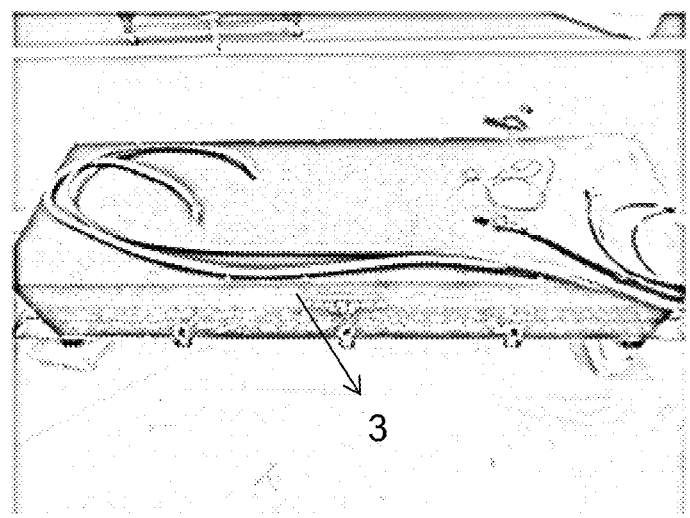
FIG. 24 shows an example of the storage system (3) used in the assembly of the management system of the present invention.
Figure 25:
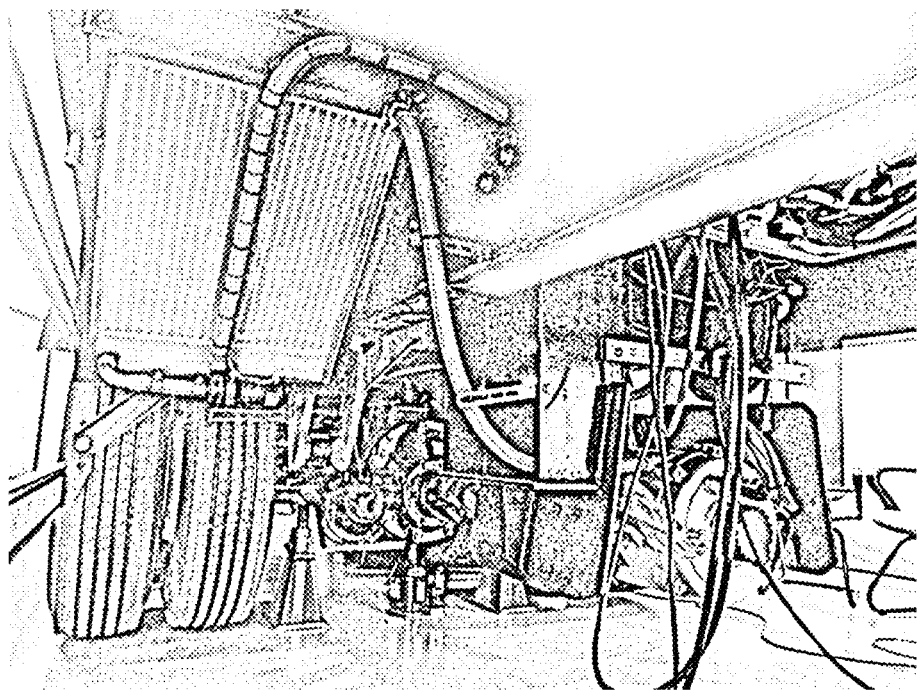
FIGS. 25 to 28 show an image sequence showing an example of the assembly of the control system (4), storage system (3), and eventual additional components to enable operation at the bottom of the road implement.
Figure 26:
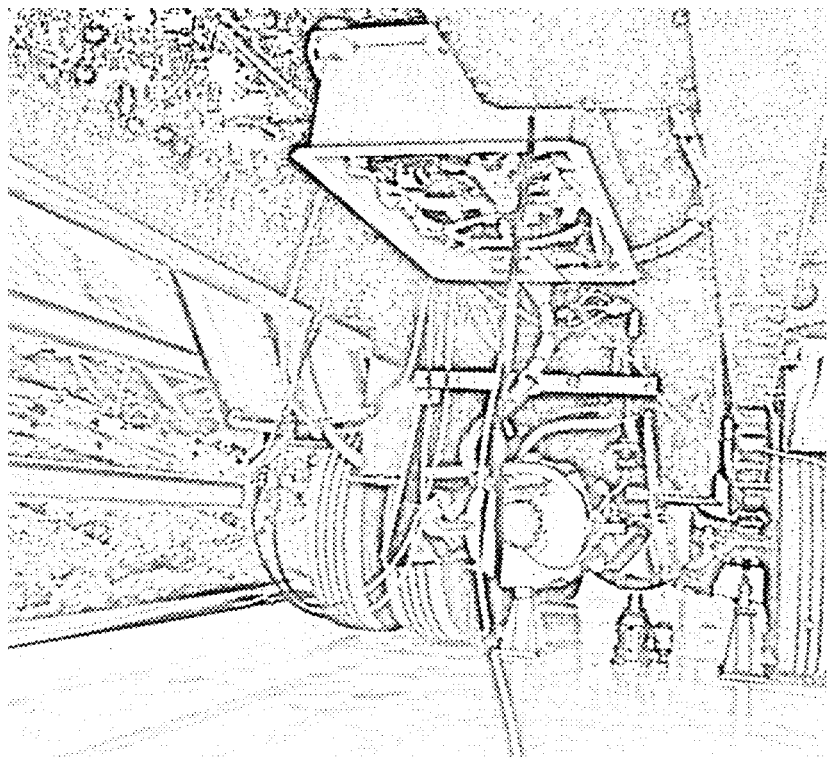
Figure 27:
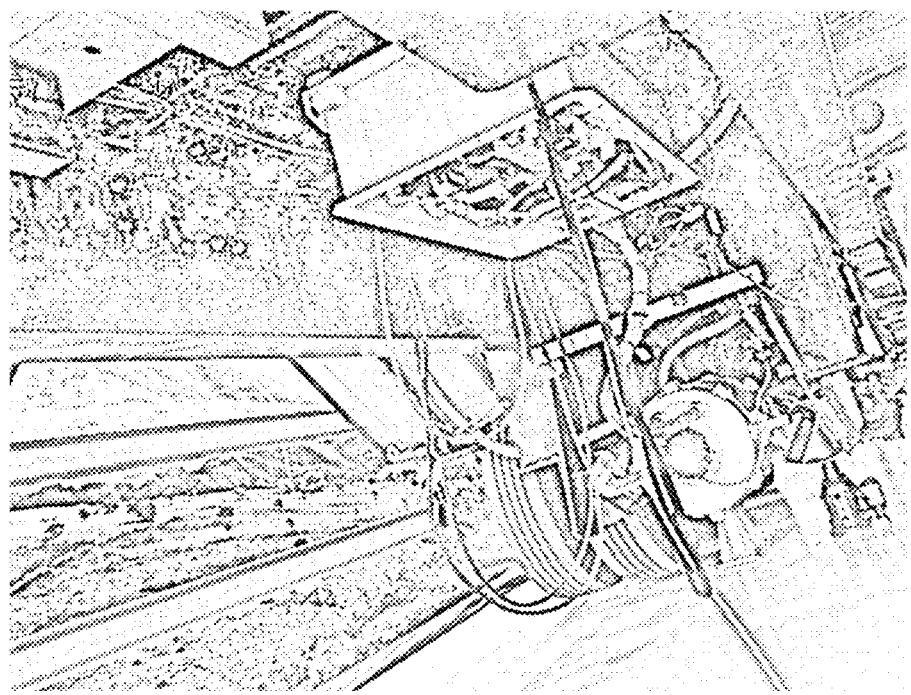
Figure 28:
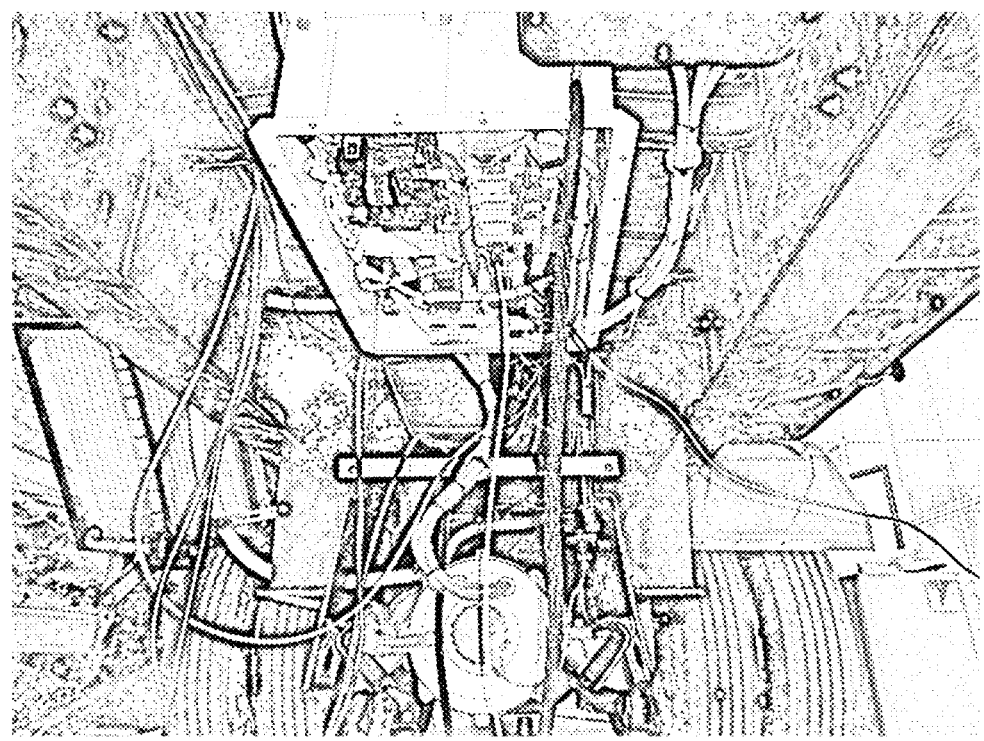

FIG. 23 shows an embodiment of the electrical energy storage system (3) and FIG. 24 shows an example of the storage system (3) being a set of several battery cells.

Figure 52:
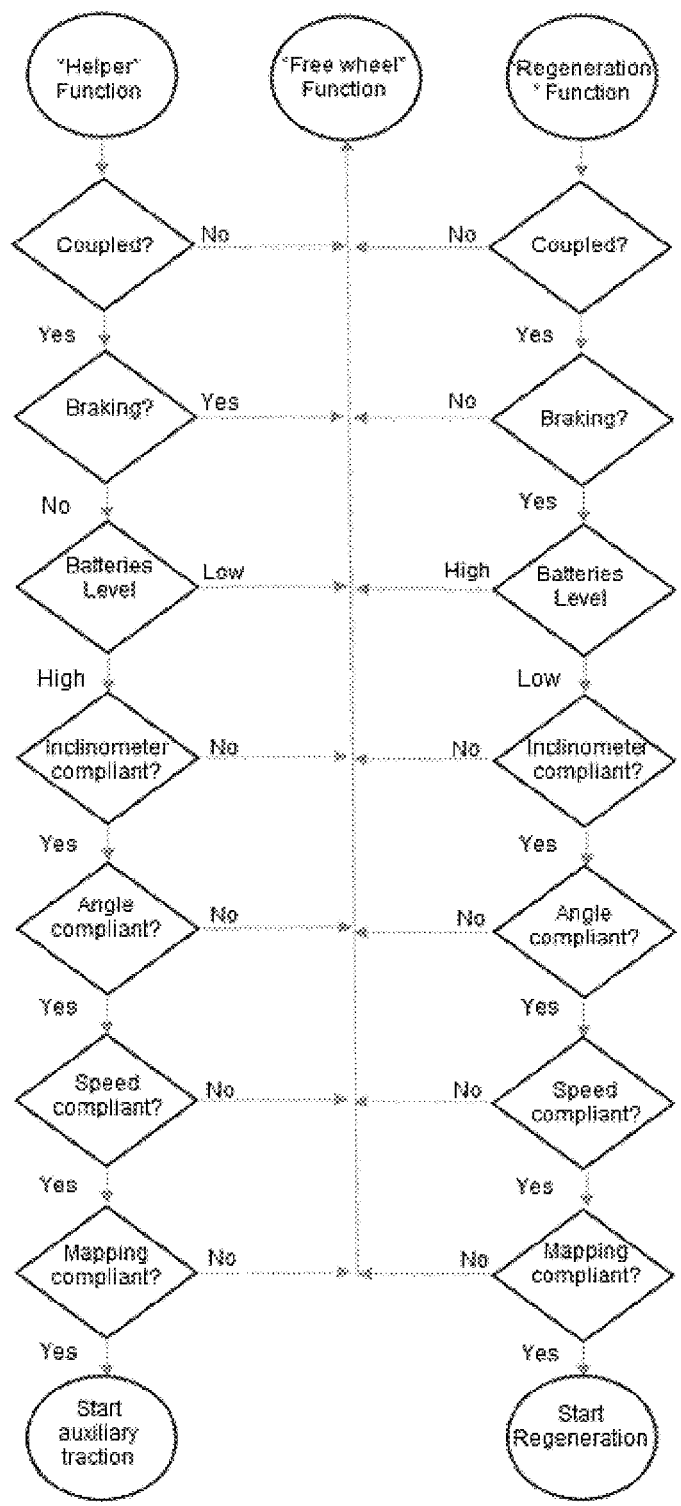
FIG. 52 illustrates an example of a flowchart with the operation modes and the respective selection rules and set.

The flowchart illustrated in FIG. 52 shows the operation modes based on the sensing system and the actuation of the power management algorithm. The system of the present invention acts in three functions, the "assistant" or helper function, which is the function that uses electric traction to assist in traction of a LCV, the "freewheel" function, wherein no traction or regeneration function is working on the shaft, and the "regeneration" function, which is the function that uses the energy of braking moments to recharge a set of batteries, this energy being used later on in times of need for auxiliary traction.

To activate the "assistant" function, as shown in FIG. 52, the power management algorithm confirms whether the implement is attached to the tractor vehicle. If so, the algorithm checks whether the road implement is in the braking process. If not, the algorithm checks the charge level of the batteries. If the battery level is high, the algorithm checks the inclination angle in a ramp. If the angle of inclination is convenient, the algorithm checks the angle between the road implement and the central reference shaft of the tractor vehicle. If the angle is convenient, the algorithm checks the speed at which the implement is and whether it is convenient to activate the auxiliary traction. If the speed is convenient, the algorithm checks the mapping of the route to be traveled and if the route is known, the algorithm automatically starts the "assistant" or helper function, that is, it starts the auxiliary traction.

Also, according to FIG. 52, if the implement is not attached to the tractor vehicle, the algorithm activates the "freewheel" function. When the "assistant" function is being executed and the implement enters the braking process, the power management algorithm activates the "freewheel" function. When the "assistant" function is being performed and the battery charge level is low, the algorithm activates the "freewheeling" mode. If the "assistant" function is being performed and the inclination angle, the implement's angle concerning the tractor's central reference shaft, and the implement's speed is not convenient for the helper to operate, the algorithm activates the "freewheeling" mode. Furthermore, when the route mapping is not known, the algorithm activates the "freewheel" function.

To activate the "regeneration" function, as shown in FIG. 52, the power management algorithm initially checks whether the implement is attached to the tractor vehicle. If the implement is attached, in the next step the algorithm checks whether the implement is in the braking process. If the implement is in the braking process, in the next step the algorithm checks the battery charge level. If the load level is low, the algorithm checks the inclination angle on slopes. If the slope angle is convenient, in the next step the algorithm checks whether the angle between the implement and the central reference shaft of the tractor vehicle and the speed of the implement are convenient. If so, in the next step the algorithm checks the known route mapping and if the route is convenient, the power management algorithm starts the "regeneration" function.

Also, according to FIG. 52, when the "regeneration" function is being executed and the implement stops performing the braking process, the algorithm activates the "freewheel" function. If the charge level of the batteries is high at times when the "regeneration" function is working, the algorithm activates the "freewheel" mode due to the sufficient charge in the batteries. In addition, if the inclination angle is a slope, the angle between the implement and the central reference shaft of the tractor vehicle and the speed is not convenient, the algorithm activates the "freewheel" mode. Also, when the mapping of the route is insufficient or is not convenient, the algorithm activates the "freewheel" mode.

With that, it is notorious that the invention is perfectly applicable to any long combination vehicles (LCV), for example, in the listed combinations foreseen in Ordinance 63/09 of DENATRAN (Brazilian Traffic Department), such as rodotrains, bitrains, etc., where the weight/power ratio is high.

Consumption Test:

For the system traction, a Permanent Magnet motor from the supplier Weg—housing 160 L was used. Said motor has an output power of 135 kW, peak power of 270 kW, battery voltage of 650 V, rated current of 225 A, maximum current of 470 A, rated speed of 3000 rpm, a maximum speed of 6000 rpm, duty cycle S9 (intermittent), ambient temperature from −20° C. to 50° C., protection degree IP66 and an approximate weight of 155 kg.

The connection between the electric motor (10) and the batteries (3) of the management system is made by a frequency inverter (2). For this purpose, a WEG CVW800 inverter was used, which, in addition to converting voltage (AC-DC/DC-AC), can be used to control and manage the sensors, as well as to execute control logic.

Said frequency inverter (2) has a nominal supply voltage of 650 Vdc, a nominal output current of 450 Arms. Overload current 1 minute 750 Arms, rated switching frequency 5 kHz. It is water-cooled, weighs 65 kg, has high compaction and power density, as well as an algorithm for controlling three-phase induction motors and permanent magnet.

In the present invention, the regenerative braking function was embodied into the integrated programmable logic controller PLC11-01, protection degree IP66 and scalar control (V/f), WW or programmable vector control, and the vector control with encoder provides a high degree of drive accuracy for the entire speed range, even with the motor stopped.

The battery used in the electric traction system was the FreedomWon Lithium Iron Phosphate battery (LiFePO$_4$), with a cell capacity of 50 Ah where it has 180 battery cells, all in series. In addition, the battery has a capacity of 29 kWh at 1 C (50 A) discharge, a nominal voltage of 576 V (3.2 V per cell), a maximum voltage of 640 V with a full charge, a minimum voltage of 520 V at 0% load, maximum output power for 30 seconds of 70 kW or 140 A, a maximum continuous output power of 60 kW or 120 A and battery weight of 250 kg.

To control the operating modes of the system and the safety systems, a set of different sensors was monitored throughout the system, monitoring the motor speed, motor reference speed, motor current, motor voltage, fault warning, motor bearing temperature, motor winding temperature, inverter temperature, charging current limit, discharge current limit, etc.

In addition, the signals from the CAN port of the cargo vehicle and different sensors of the semi-trailer were monitored, including angular monitoring and vector loading sensors in the LCV kingpin/fifth wheel coupling.

To transmit the movement of the electric motor (10) to the wheels, a differential shaft from Mentor MR-25-168 was used, with a reduction of 6.83:1. The transmission between the shaft and the motor was performed by a Cardan shaft (13) and the isolation between the electric motor (10) and the Cardan shaft (13) was performed using a Celeron plate.

For the performance of the functional tests, a Volvo FH 440 tractor vehicle—6×4 traction was used.

The system of management for electrical actuation described above was implemented on a Random 3-shafts semi-trailer. FIGS. 25, 26, 27, and 28 show the application of the system.

Figure 49:
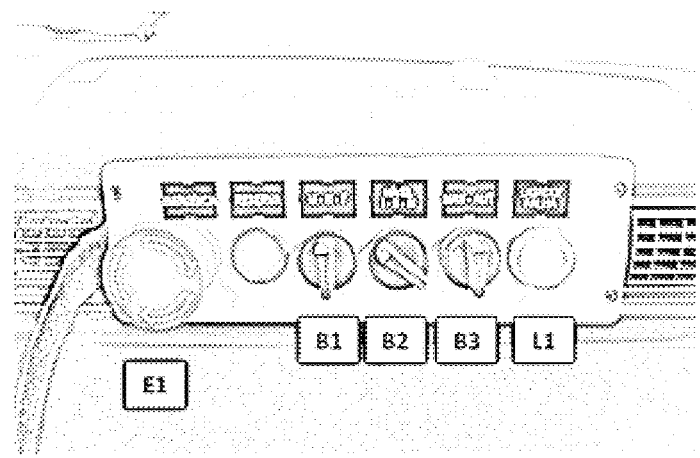
FIG. 49 shows an embodiment of the operation panel (5).
Figure 50:
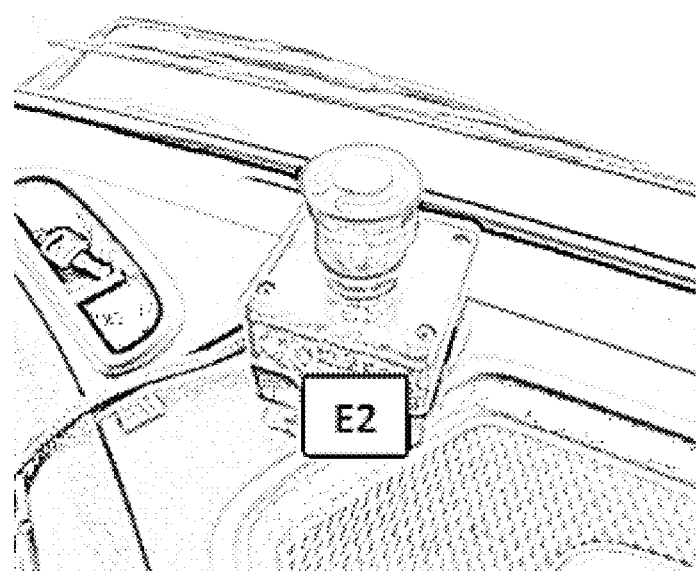
FIG. 50 shows an embodiment of the operation panel (5).

Example 3—Control System of Electric Traction Implement with Drive Control in the Driver Cab In this test, the operation of the system was controlled by an operation panel (5) which is located inside the tractor vehicle cabin, being built in a simplified way only for the execution of the tests, as shown in FIGS. 49 and 50. On panel (5), the E1 button is the emergency button and turns off the entire system, the B1 button performs the operating mode command, positioning the B1 button in the M position starts the engine in traction mode, pulling the combination and consuming energy, positioning the B1 button in the N position keeps the engine in neutral mode, positioning the B1 button in the F position starts the engine in braking mode, braking the combination and regenerating energy, button B2 defines the power modes (levels I, II and III), button B3 refers to the manual or automatic operation mode, wherein the automatic control of the operating modes is done by the algorithm, the L1 button refers to an operation indicator LED, wherein the continuous blue LED indicates the correct operation of the system and the flashing blue LED indicates the incorrect operation of the system and the E2 button is the emergency button 2 which turns off the entire system and is an exclusive button for the vehicle driver.

The blue LED lights up when the system is powered up. From this moment on, under normal operating conditions, it always remains on. In the event of a system failure, which is monitored through the different installed sensors, LED starts to operate intermittently. In this case, it is necessary to access the control system (4) of the system, located on the frequency inverter (2), check the code and the reason for the fault presented.

Fuel Consumption Tests

Consumption tests were performed to map the potential for reducing consumption of the system when applied in long combination vehicles. For the elaboration of the procedure, the consumption references of the SAE J1321 OCT86—JOINT TMC/SAE FUEL CONSUMPTION TEST PROCEDURE—TYPE II standard, were consulted.

Before starting the test, the driving conditions of the tested combination were checked, and the vehicle was filled, and the tires were calibrated. In addition, the auxiliary fuel tank was weighed and filled, which was used to collect LCV consumption data.

Before starting the consumption test, the vehicle was run for 1 hour, in order to stabilize all temperatures of the vehicle and its components.

Then, the tractor+semi-trailer combination was traveled to the starting point of the route. The combination was positioned with the portable fuel tank disconnected and the electric traction system turned off. After positioning the vehicle, the fuel supply lines were connected, and the electric traction system was activated.

With the vehicle off, the distance traveled, average speed, and test time in the data acquisition system were reset. Data acquisition was initiated at the time of vehicle departure.

The defined route was executed, maintaining the driving standards for all routes performed. The tests were performed without the use of the vehicle automatic pilot and always by the same test pilot. The pilot traveled at the speeds of the route, adopting running patterns, which were used in all stages of the test. After finishing the running, the vehicle was stopped at the point defined as the endpoint of the route, and the portable fuel supply system was turned off.

Consumption Calculation:

Before running in, the portable fuel tank was filled to the maximum limit indicated. The portable fuel tank must be equipped with quick couplings, which allow alternating its use with the vehicle's original fuel tank.

After refueling, the fuel tank was weighed on a precision scale and the values were recorded.

After the test was performed, the fuel tank was weighed again, and the values found were recorded.

The calculation of fuel consumption was performed through the difference between the initial mass and final mass of fuel for each route performed.

Each TS (Test Segment) was composed of three valid samples. For the samples to be considered valid, they must be within a range with a maximum variation of 2%. The 2% range means that the lowest TS value cannot be more than 2% below the highest TS value obtained.

Routes:

The tests were carried out on two routes: Short Haul and Long Haul.

Figure 29:
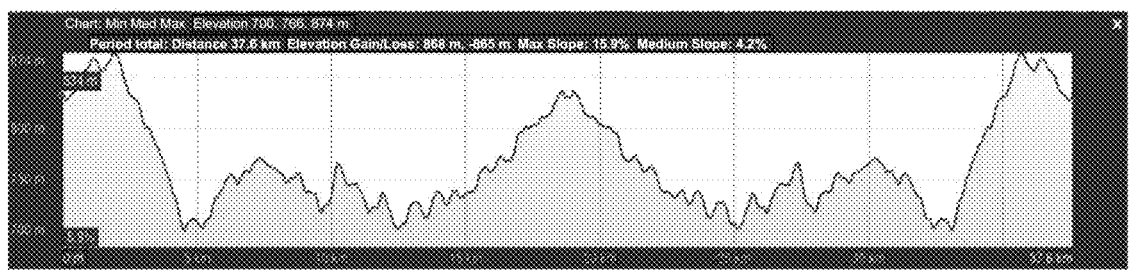
FIG. 29 shows the ramp and slope situations present in a 37-km route performed to test the system of the present invention.

The short-haul was used for rapid tests and has parts of ramp and slope of a lesser extent. The total length of this route is 37 km. FIG. 29 shows the ramp and slope situations present on the 37 km route, as well as the figure shows the slopes and ramp along the route.

Figure 30:
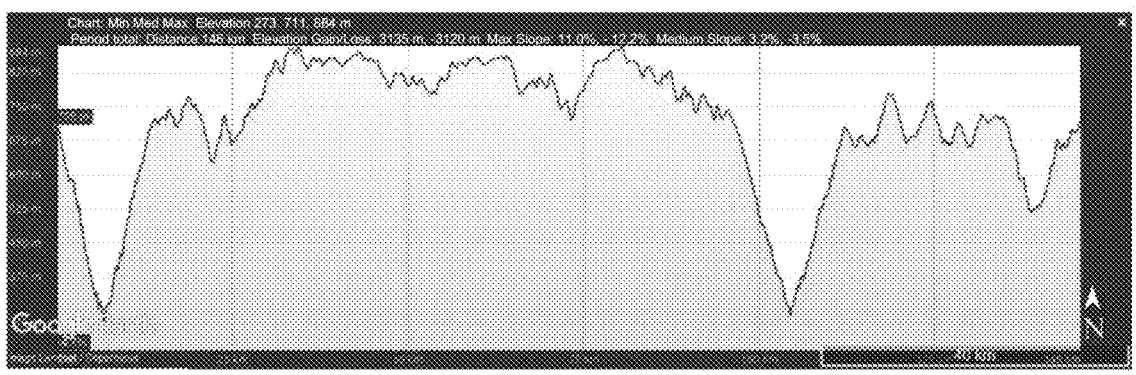
FIG. 30 shows the ramp and slope situations present on a 148-km route performed to test the system of the present invention.

The long route was used to perform tests in a longer test period, similarly to mountain parts with greater extension. The total length of this route is 148 km. FIG. 30 shows the ramp and slope situations present on the 148 km route, as well as illustrating the slopes and ramps along the route.

The consumption results in fuel liters obtained for the short-haul without the use of the electric traction system are illustrated in table 1 below:

TABLE 1

| | | | Data without the present invention Internal Route | | | |
|---|---|---|---|---|---|---|
| | | | Filled weight (g) | Empty weight (g) | Consumed (g) | Consumed (L) |
| L5/06/2019 | | | 97,410 | 75,825 | 21,585 | 25.3 |
| | | | Vmean | 57.0 | km/h | |
| On-board computer | | | Distance | 37.3 | km | |
| | | | Consumption | 1.4 | km/L | |
| | | | Volume | 26.1 | Liters | |
| | | | | Consumption | 21,585.0 | Grams |
| Diesel density | 0.853 | | kg/L | Consumption | 25.3 | Liters |
| Route distance | 37 | | Km | Consumption (km/L) | 1.47 | km/l |
| | | | | Truck ECU | 26 | |

The consumption results in liters of fuel obtained for the short-haul using the electric traction system are shown in table 2 below:

TABLE 2

| | Data with the use of the present invention | | | | |
|---|---|---|---|---|---|
| | Filled weight (g) | Empty weight (g) | Consumed (g) | Consumed (L) | |
| Sample 1 | 72,442 | 53,884 | 18,598 | 21.8 | |
| | 53,771 | 33,826 | 19,945 | 23.4 | |
| Sample 2-Arq. 67 | 73,611 | 56,625 | 16,986 | 19.9 | −12.2% |
| May 14, 2019 | Vmean | — | km/h | | |
| On-board computer | Distance | — | km | | |
| | Consumption | — | km/L | | |
| | Volume | — | Liters | | |
| Sample 2-Arq. 70 | 56,625 | 39,913 | 16,712 | 19.6 | −14.1% |
| May 14, 2019 | Vmean | — | km/h | | |
| On-board computer | Distance | — | km | | |
| | Consumption | — | km/L | | |
| | Volume | — | Liters | | |
| Sample 3-Arq. 75 | 86,002 | 69,587 | 16,415 | 19.2 | −16.1% |
| May 15, 2019 | Vmean | — | km/h | | |
| On-board computer | Distance | — | km | | |
| | Consumption | — | km/L | | |
| | Volume | — | Liters | | |
| Sample 4-Arq. 80 | 69,587 | 54,390 | 15,197 | 17.8 | −25.5% |
| May 16, 2019 | Vmean | — | km/h | | |
| On-board computer | Distance | — | km | | |
| | Consumption | — | km/L | | |
| | Volume | — | Liters | | |
| Arq. 117-06/12 | 99,782 | 82,963 | 16,819 | 19.7 | −28.3% |
| Jun. 12, 2019 | Vmean | 55.0 | km/h | | |
| On-board computer | Distance | 37.3 | km | | |
| | Consumption | 1.8 | km/L | | |
| | Volume | 20.2 | Liters | | 29.2% |
| Arq. 124-06/12 | 81,116 | 63,370 | 16,746 | 19.6 | −28.6% |
| Jun. 12, 2019 | Vmean | 53.0 | km/h | | |
| On-board computer | Distance | 37.3 | km | | |
| | Consumption | 1.8 | km/L | | |
| | Volume | 20.1 | Liters | | 29.9% |
| AVG | | Fuel weight | 16,783 | Grams | 28.6% |
| Diesel density | 0.853 | kg/L | Consumption | 19.7 | Liters |
| Route distance | 37 | Km | Consumption (km/L) | 1.89 | km/l |

The consumption results in fuel liters obtained for the long haul without the use of the electric traction system are illustrated in table 3 below:

TABLE 3

| | Consumption of fuel without the present invention Internal Route | | | |
|---|---|---|---|---|
| | Filled weight (g) | Empty weight (g) | Consumed (g) | Consumed (L) |
| Jun. 1, 2019 | | | | |
| Reference Route | 120,144 | 23,360 | 98,784 | 113.5 |
| | Vmean | 53.0 | km/h | |
| On-board computer | Distance | 148.2 | km | |
| | Consumption | 1.2 | km/L | |
| | Volume | 119.0 | Liters | |
| Jun. 10, 2019 | | | | |
| Reference Route | 134,099 | 35,401 | 98,698 | 115.7 |
| | Vmean | 51.0 | km/h | |
| On-board computer | Distance | 148.2 | km | |
| | Consumption | 1.2 | km/L | |
| | Volume | 121.0 | Liters | |
| Diesel density | 0.853 kg/L | Consumption | 97,741.6 | Grams Liters |
| Route distance | 148 Km | Consumption | 114.6 | km/l |
| | | Consumption (km/L) | 1.29 | |
| | | Truck ECU | 120 | |

The consumption results in fuel liters obtained for the long haul using the electric traction system are shown in table 4 below:

TABLE 4

Consumption with the present invention

|  | Filled weight (g) | Empty weight (g) | Consumed (g) | Consumed (L) |  |
| --- | --- | --- | --- | --- | --- |
| Arq. 101-06/01 | 113,125 | 28,511 | 84,614 | 99.2 | 15.5% |
| Jun. 01, 2019 | Vmean | 52.0 | km/h |  |  |
| On-board computer | Distance | 148.1 | km |  |  |
|  | Consumption | 1.4 | km/L |  |  |
|  | Volume | 119.0 | Liters |  | 16.5% |
| Arq. 107-06/07 | 163,127 | 45,332 | 90,795 | 106.4 | 7.7% |
| Jun. 07, 2019 | Vmean | 51.0 | km/h |  |  |
| On-board computer | Distance | 148.2 | km |  |  |
|  | Consumption | 1.3 | km/L |  |  |
|  | Volume | — | Liters |  | ND |
| Arq. 111-06/11 | 127,954 | 39,359 | 88,595 | 103.9 | 10.3% |
| Jun. 11, 2019 | Vmean | 50.0 | km/h |  |  |
| On-board computer | Distance | 148.2 | km |  |  |
|  | Consumption | 1.3 | km/L |  |  |
|  | Volume | 107.3 | Liters |  | 11.8% |
| AVG |  | Fuel Weight | 86,605 | Grams | 12.9% |
| Diesel density | 0.853 | kg/L | Consumption | 101.5 | Liters |
| Route distance | 148 | Km | consumption (km/L) | 1.46 | km/l |

Example 4—Sensing System in the Fifth Wheel and/or Intelligent Kingpin

In this example, the fifth wheel and/or intelligent kingpin are provided with a sensing system (9) that sends signals to a control system (4) of the coupling and synchronization set of the traction vectors of the tractor vehicle and the implement comprising auxiliary system traction or helper.

The sensing system (9) is a set of sensors that signals to the control system (4) the operation modes of the system of management for electrical actuation and road implements.

The set of sensors measures direct and indirect signals. Direct measurements are signals from the angular motion sensor and vector load sensor arranged on the fifth wheel and kingpin, as well as from motion sensors on the implement.

The sensors that are present in the fifth wheel and/or the kingpin are selected from the group comprising: load sensors; gauges; position sensors; laser sensors; or other sensors sending signals about the position, force, or relative acceleration between the vectors of the tractor vehicle and the road implement.

Figure 31:
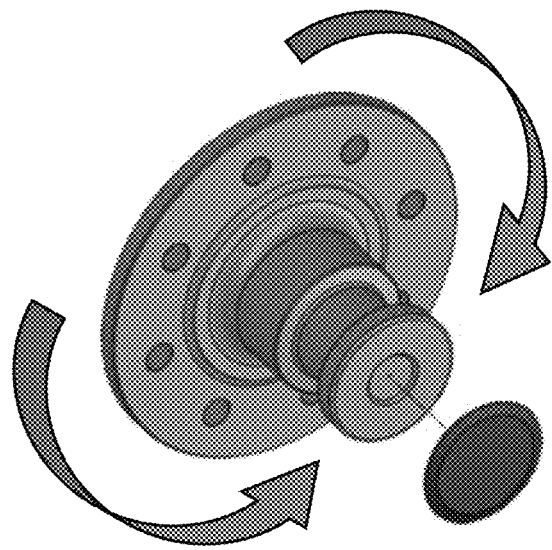
FIG. 31 shows a schematic representation of an embodiment of the kingpin and the angular movement vectors capable of being detected.

FIG. 31 shows a schematic representation of an embodiment of the kingpin of the present invention.

Figure 32:
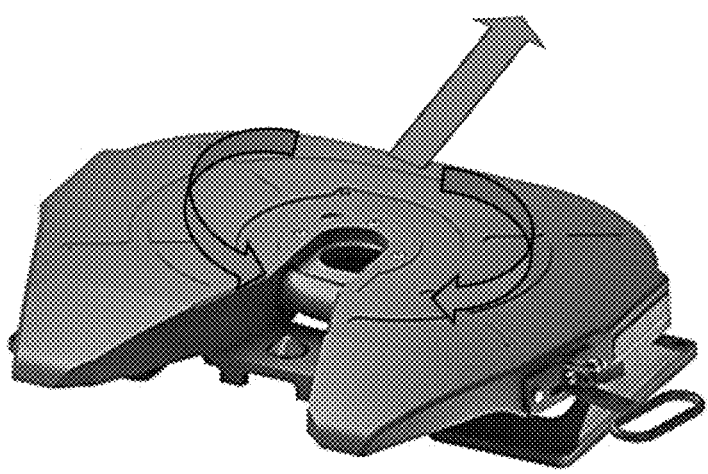
FIG. 32 shows a schematic representation of an embodiment of the fifth wheel and the angular movement vectors and vector load capable of being detected.

FIG. 32 shows a schematic representation of an embodiment of the fifth wheel of the present invention.

Those skilled in the art know that the tractor vehicle provided with a fifth wheel is coupled to a road implement, for example, a semi-trailer, through the kingpin. The signals provided by the present invention are used for monitoring and/or subsequent processing by the control system (4) that controls (activates/deactivates) the auxiliary electric motor (10) of the implement.

Figure 33:
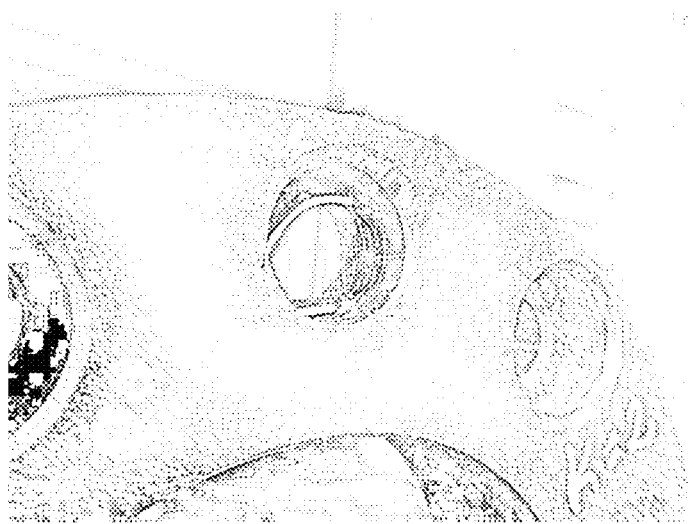
FIG. 33 shows an embodiment of the fifth wheel in installation process of a sensitive element for data collection.

FIG. 33 shows an embodiment of the fifth wheel, in which it shows a detail of the so-called wearing ring of the fifth wheel, equipped with sensors, which translates load signals between the tractor vehicle and the implement.

Figure 34:
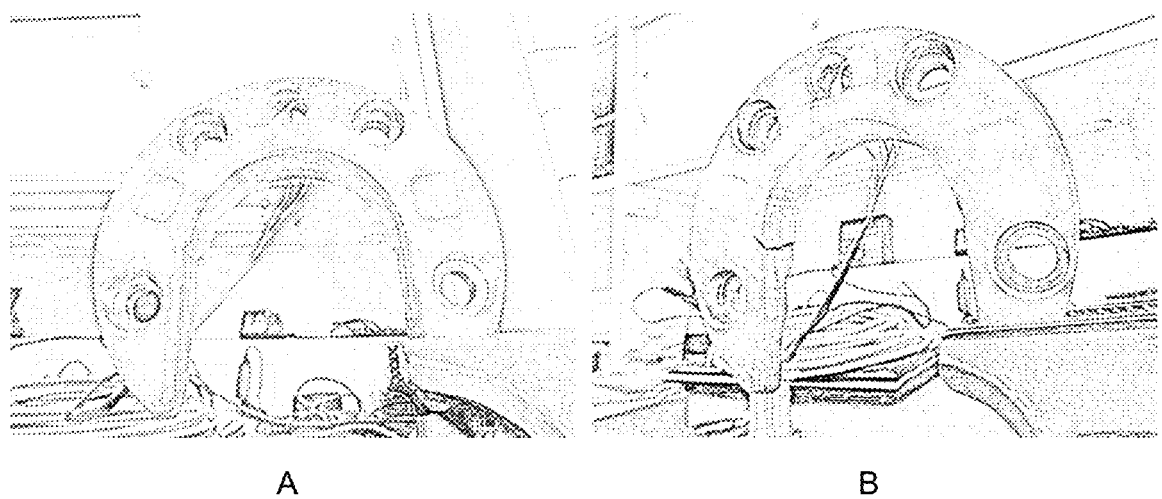
FIG. 34 shows the same embodiment illustrated in FIG. 33, with (A) being a frontal view and (B) being another perspective view.

FIG. 34 shows the same embodiment illustrated in FIG. 33, showing other views of the wearing ring with sensors. In A) a frontal view is shown and in B) another perspective view is shown.

Figure 35:
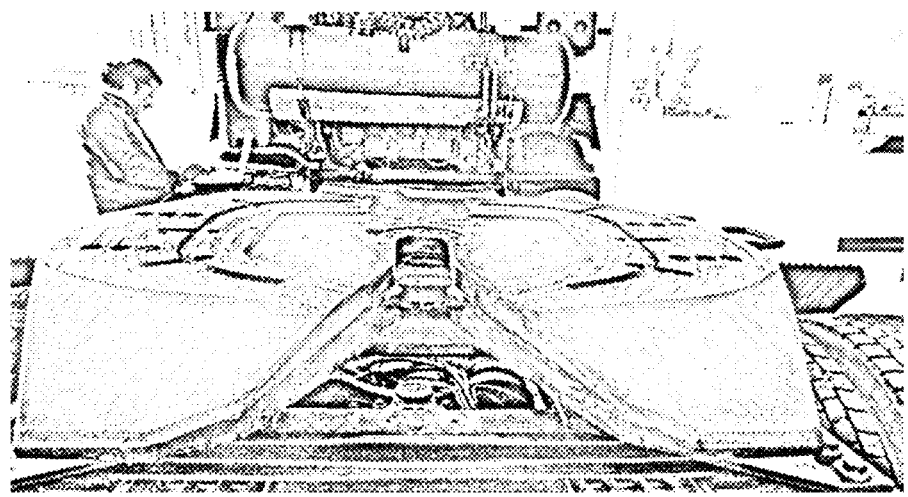
FIG. 35 shows the fifth wheel embodiment assembled on a tractor vehicle.

FIG. 35 shows an embodiment of a fifth wheel present in a tractor vehicle, showing the steering location to fit the kingpin to the mechanical lock or parrot spout.

Figure 36:
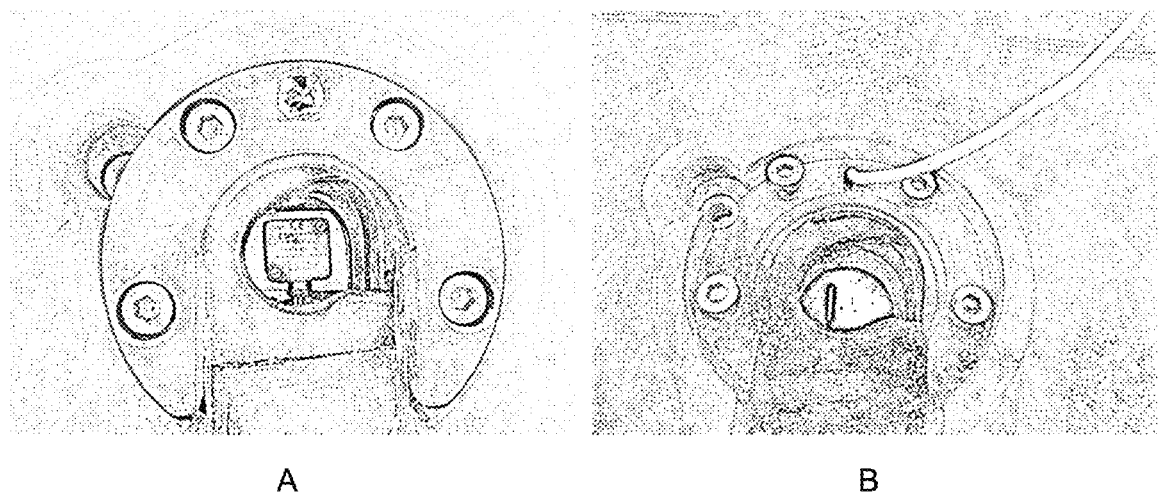
FIG. 36 shows a fifth wheel embodiment, wherein in (A) the wearing ring of fifth wheel with sensors is shown (as shown in FIGS. 33 and 34) and in (B) the detail of the cable passage is illustrated.

FIG. 36 shows the wearing ring mounted on the fifth wheel and in position. In A) the horseshoe with sensors (as shown in FIGS. 33 and 34) mounted on the fifth wheel is shown. In B) the detail of the cable passage that sends the signals from the wearing ring sensors before the mounting of the wearing ring on the fifth wheel is illustrated.

Figure 37:
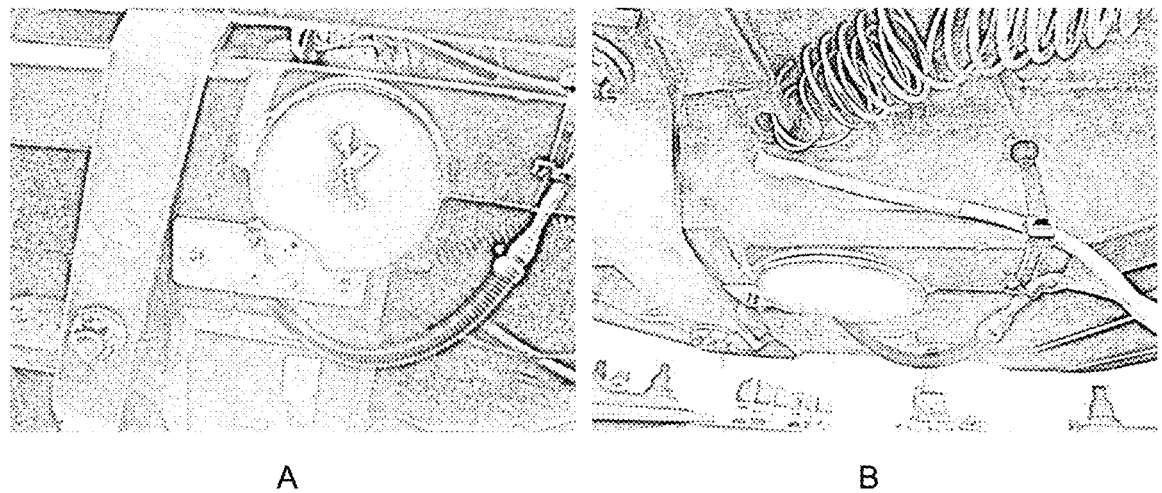
FIG. 37 shows in (A) and (B) an example of the implemented angular motion sensor.
Figure 38:
FIG. 38 shows the operation check of the angular motion sensor.
Figure 39:
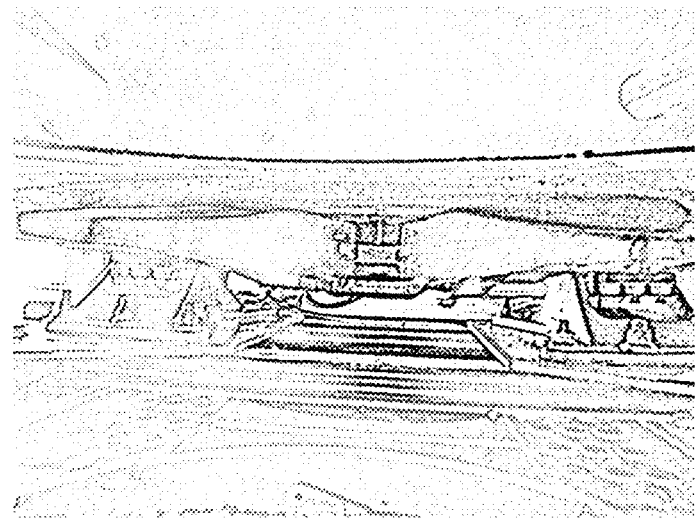
FIG. 39 shows the operation check of the angular motion sensor.
Figure 40:
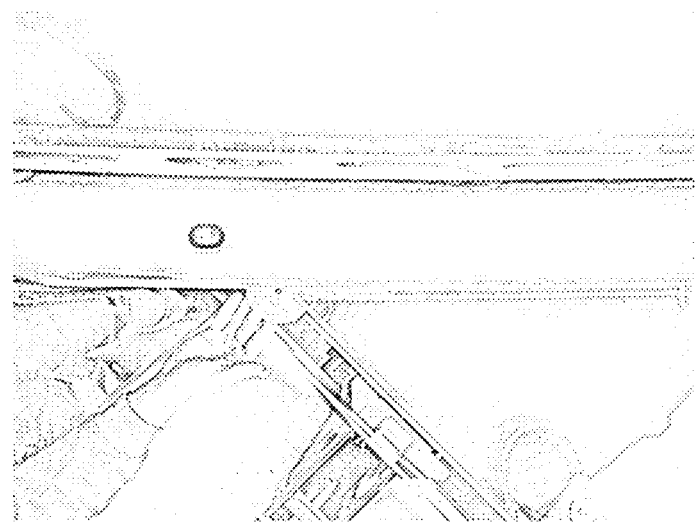
FIG. 40 shows the verification of the operation of the angular motion sensor.
Figure 41:
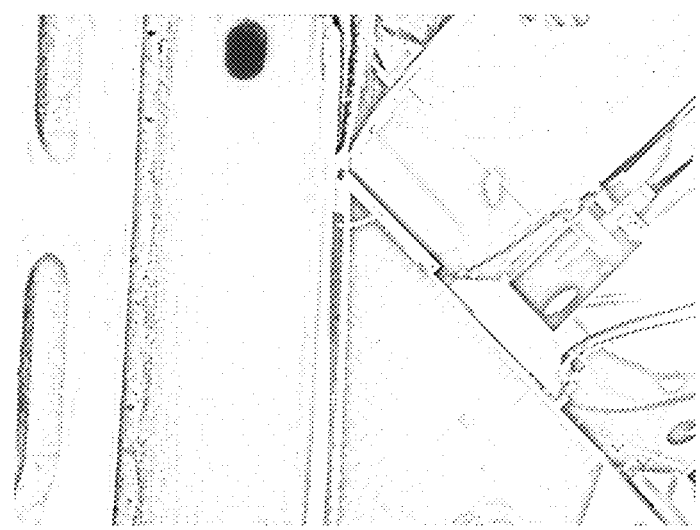
FIG. 41 shows the verification of the operation of the angular motion sensor.

FIG. 37 in A) and B) show the installed angular motion sensor, as well as FIGS. 38 to 41 show the verification of the operation of the angular motion sensor.

Thus, this embodiment of the present invention provides data that enable the safe operation of an auxiliary motor in the implement, upon command to activate/deactivate the auxiliary traction depending on the signals that the said control unit receives from the intelligent kingpin and/or fifth wheel.

The control unit can additionally process data from other sources, such as braking signals from the tractor vehicle umbilical, which are also useful for deactivating the auxiliary drive system and increasing LCV safety under different operating conditions, including positioning resulting from directional maneuvers, traction, compression, acceleration braking and their relationship with the relative positions between the tractor vehicle and the implement.

In this embodiment, the auxiliary traction or helper system of the road implement comprises: (i) a kinetic energy recovery system in a decelerating condition (braking); (ii) a system for storing this energy in batteries; and (iii) an electric motor powered by the aforementioned batteries, to serve as an auxiliary tractor element in times of greater demand from the set.

In this embodiment, a road implement, a tractor unit, a kingpin of the road implement with an angular sensor, and a fifth wheel of the tractor unit with a longitudinal sensor were used.

The road implement with an auxiliary traction system was coupled to the tractor unit. When traveling with the tractor unit and the road implement, it was necessary to make several turns during the route. The set mapped the angulation and movement of the coupling and then corrected its angulation when curves were required. A shorter haul for the realization of a curve was compared when compared to the route required for the prior art curve.

The control unit can additionally process data from other sources, such as braking signals from the tractor vehicle umbilical, which are also useful for deactivating the auxiliary drive system and increasing LCV safety under different operating conditions, including positioning resulting from directional maneuvers, traction, compression, acceleration braking and their relationship with the relative positions between the tractor vehicle and the implement.

Example 5—Load Vs Deformation Tests

Tests relating to the load and strain were also performed on a test bench. The data of the calibration performed are shown in table 5 below:

TABLE 5

Calibration on Laboratory
Load vs. Deformation

| Load [kgf] | Load [kN] | Strain |
|---|---|---|
| 0 | 0 | 0 |
| 306 | 3 | −105 |
| 510 | 5 | −174 |
| 815 | 8 | −255 |
| 1019 | 10 | −314 |
| 1223 | 12 | −363 |
| 1427 | 14 | −419 |
| 1631 | 16 | −479 |
| 1835 | 18 | −525 |
| 2039 | 20 | −585 |

Figure 42:
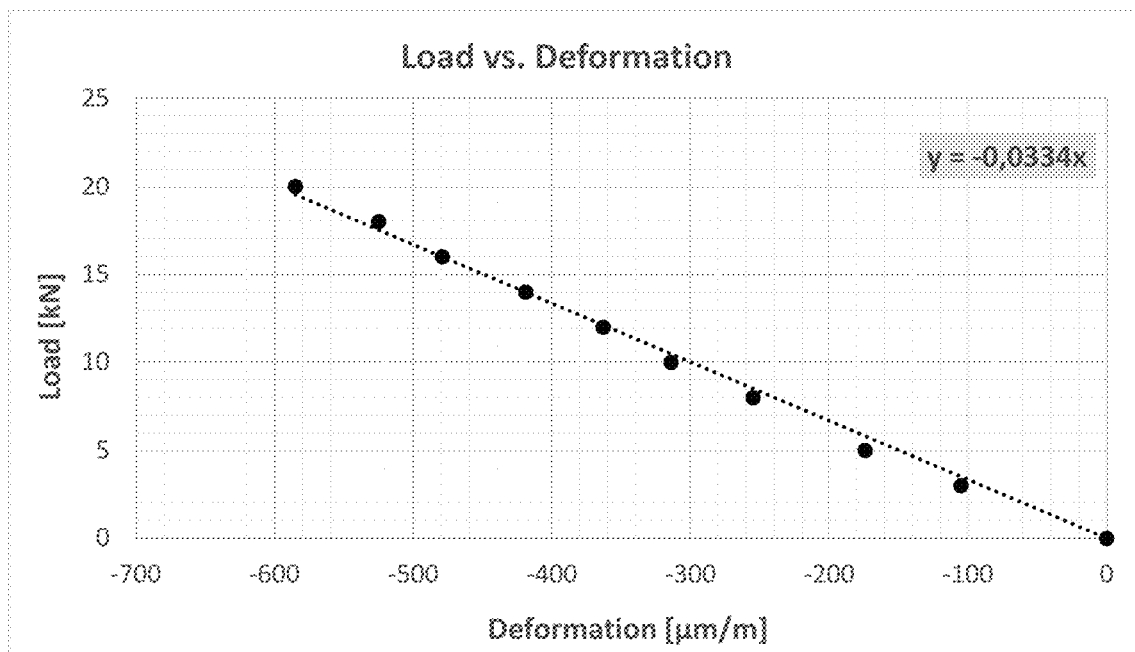
FIG. 42 shows a chart relating Load vs. Deformation in a test performed from the fifth wheel embodiment of the previous figures.

FIG. 42 shows a chart relating Load vs. Strain in a test performed from the fifth wheel described above.

The data of experiments related to the force in the coupling system, angle between the tractor vehicle, vehicle speed, and wheel speed are illustrated in FIGS. 43 to 48.

Figure 43:
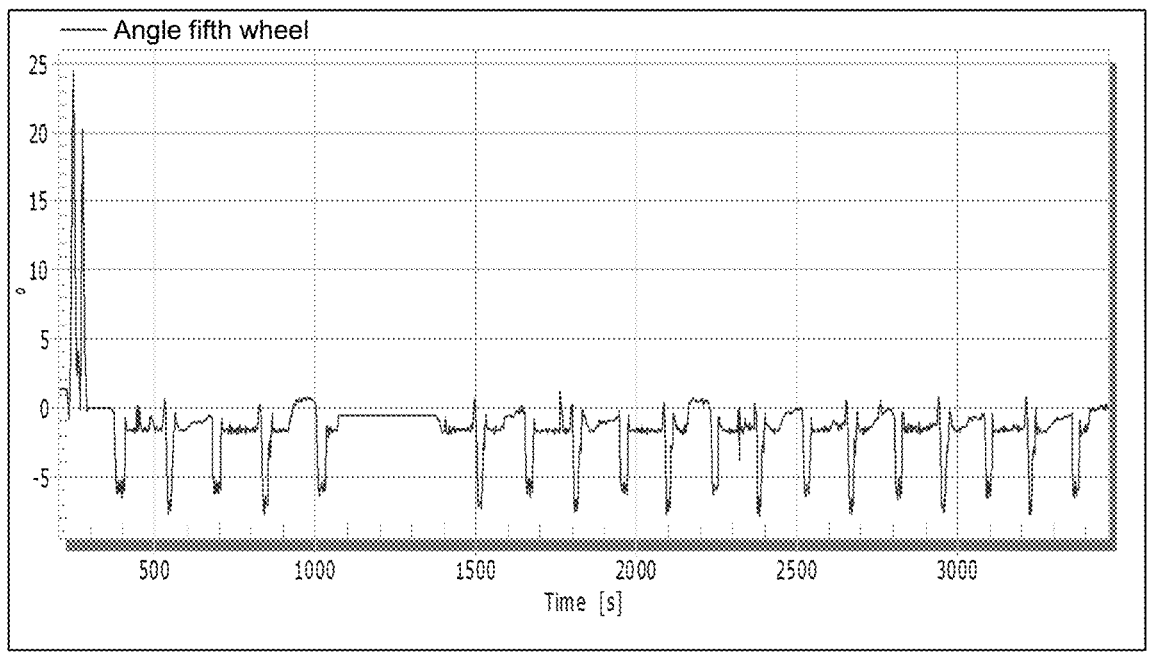
FIG. 43 shows a test to check the angular motion sensor actuation.
Figure 44:
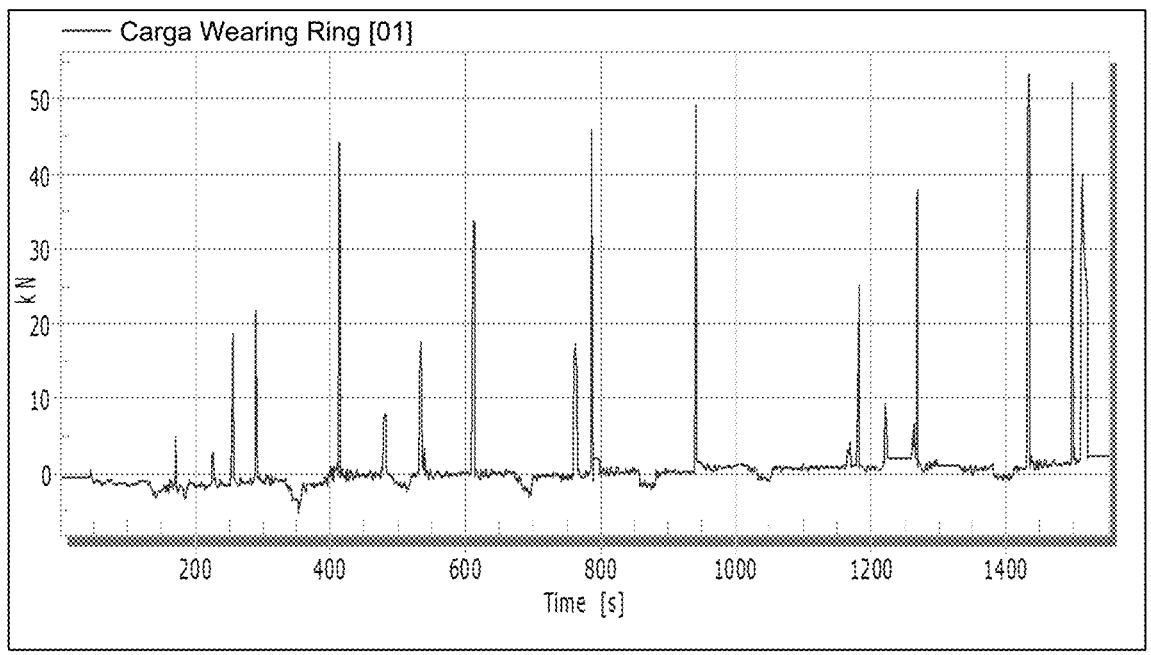
FIG. 44 shows the test to check the vector load sensor actuation.

FIG. 43 shows the check test of the angular motion sensor performance, illustrating the angular variation in relation to time. FIG. 44 shows the test to check the performance of the vector charge sensor, illustrating the variation of the charge in kN in relation to time.

Figure 45:
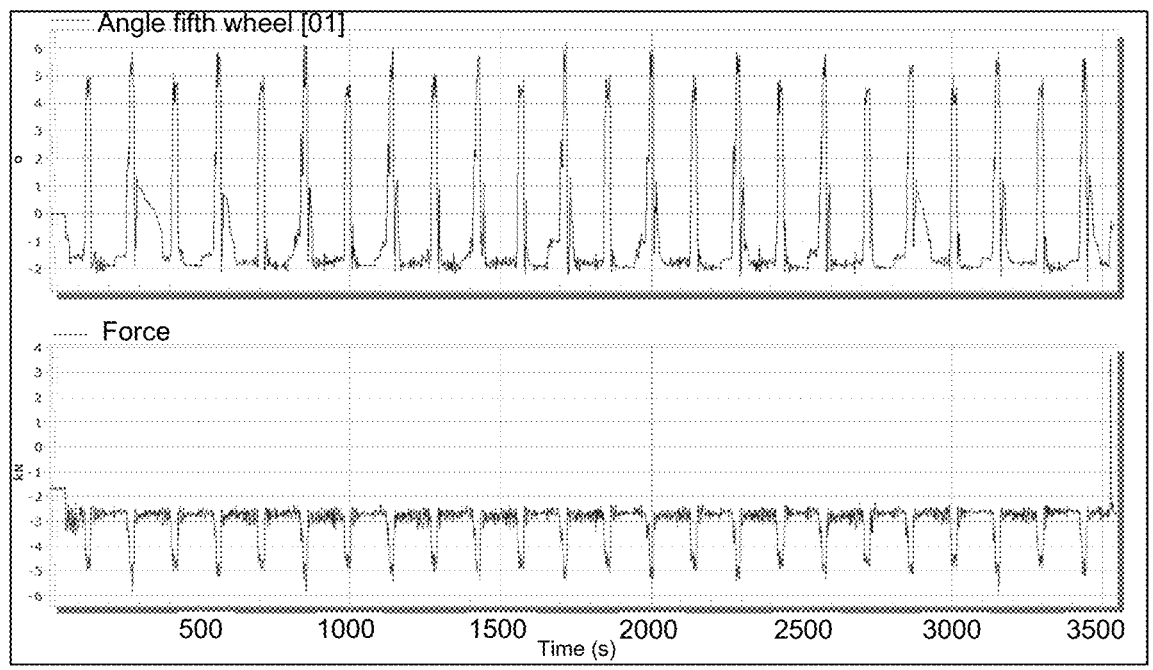
FIG. 45 shows test performance data in a test center for changes in the angular motion sensor (top chart) and changes in the vector load sensor (bottom chart).

FIG. 45 shows data from tests performed in a test center, wherein angular motion sensor variations (top chart) were acquired in route with the variation of the angle in relation to time and the variations of the charge sensor vector (graph chart) with the variation of the load in kN in relation to time.

Figure 46:
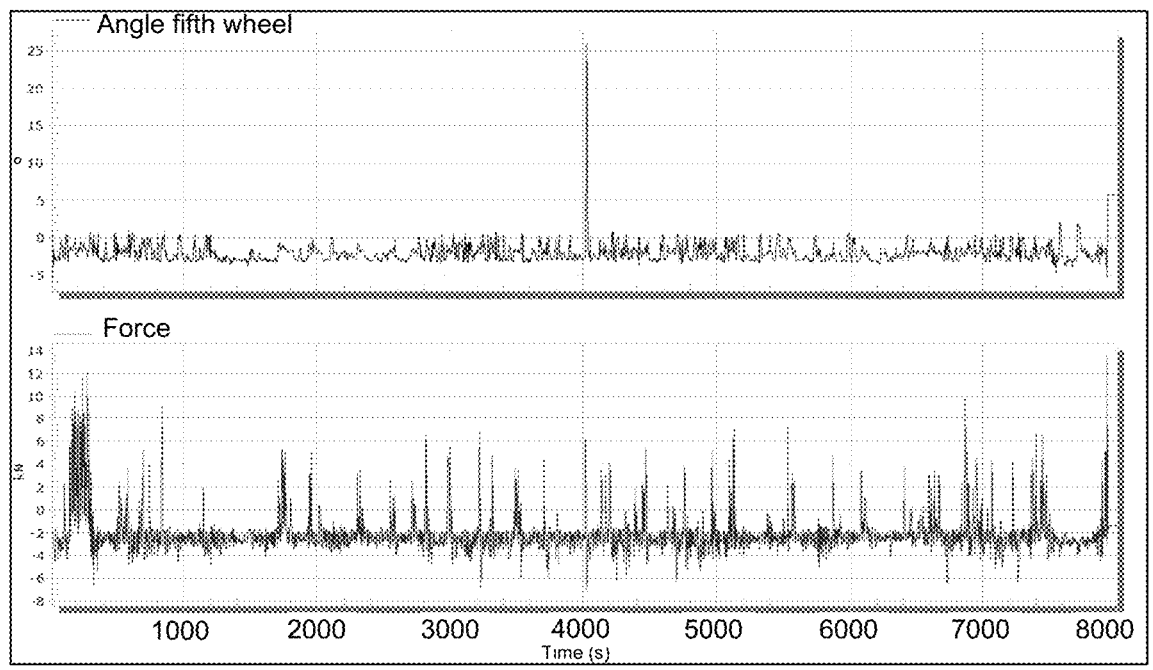
FIG. 46 shows test performance data on the external route for the changes of the angular motion sensor (top chart) and the changes of the vector load sensor (bottom chart).

FIG. 46 shows data for performing tests on the external route, wherein the variations of the angular motion sensor, shown in the top chart, and the variations of the vector charge sensor, shown in the bottom chart, were acquired.

Figure 47:
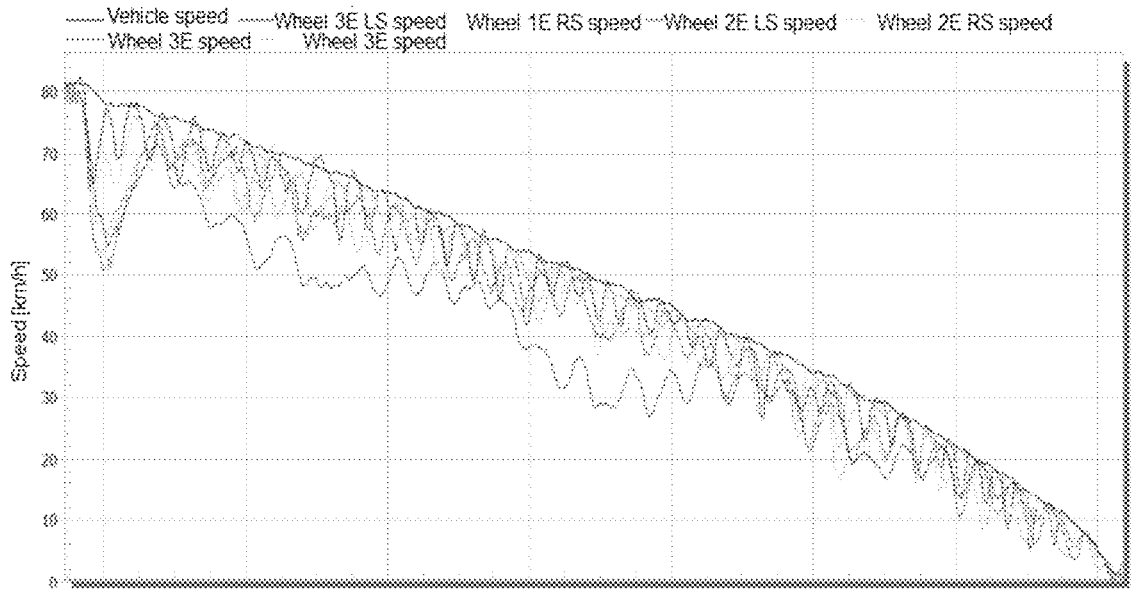
FIG. 47 shows test performance data for vehicle speed and wheel speed data for the decelerating road implement.

FIG. 47 shows vehicle speed data and wheel speed data from the decelerating road implement, illustrating the speeds on the right and left wheels of the first shaft, the right and left wheels of the second shaft, and the right and left wheels of the third shaft of the implement.

Figure 48:
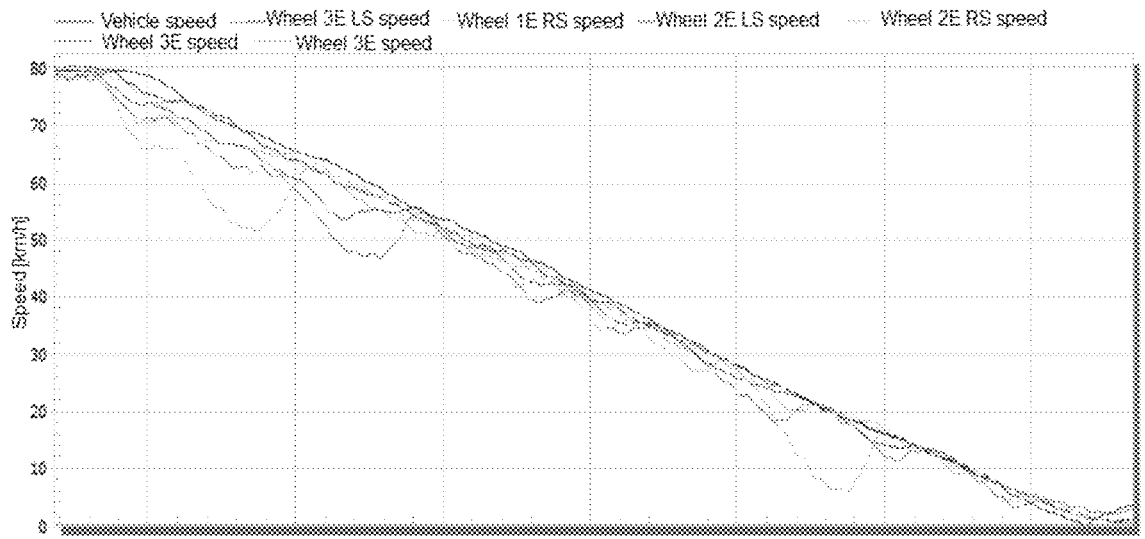
FIG. 48 shows likewise FIG. 47 the test performance data for vehicle speed and wheel speed data for the decelerating road implement.

FIG. 48, in the same way as FIG. 47, shows vehicle speed data and wheel speed data from the decelerating road implement, illustrating the speeds on the right and left wheels of the first shaft, on the right and left wheels of the second shaft, and on the right and left wheels of the third shaft of the implement.

Those skilled in the art will appreciate the knowledge showed herein and will be able to reproduce the invention in the modalities showed and in other variants and alternatives, covered by the scope of the following claims.

The invention claimed is:

1. System configured for managing a safe actuation of an auxiliary traction in road implements promoting safe management of the actuation of the auxiliary traction, the system comprising at least one sensing system, which reads multiple signals from at least one sensor installed on the road implement, and a control system that receives the multiple signals read by the at least one sensing system, wherein the control system selects one operating mode from a set of predefined operating modes based on the multiple signals read by the at least one sensing system, thus controlling the actuation of the auxiliary traction, wherein the set of predefined operating modes comprises: i) electric traction; ii) regenerative braking; and iii) free shaft;
the control system is provided with a security mode operation, where the control system is set as default to initiate and maintain in the operating mode iii) free shaft;
the control system checks predefined multiple safety requirements, and whether the predefined multiple predefined safety requirements are fulfilled, the control system is able to select and change the operating mode, in order to select either i) electric traction or ii) regenerative braking, wherein:
the control system maintains the operating mode iii) free shaft until the multiple predefined safety requirements are fulfilled; and
the control system is provided with an order of priority for checking two or more requirements from the predefined multiple safety requirements;
wherein the predefined multiple safety requirements related to the signals provided by the at least one sensing system to the control system.

2. System configured for managing the safe actuation of the auxiliary traction in road implements of claim 1, wherein the auxiliary traction involves electric traction and regenerative braking, wherein the system comprises at least one electric motor, interacting with at least one shaft of the road implement, and at least one electrical energy storage system, the operation of the electric motor and the electrical energy storage system being controlled by the control system connected to said electric motor and electrical energy storage system.

3. System configured for managing the safe actuation of the auxiliary traction in road implements of claim 2, wherein the control system is communicating with the at least one sensing system, wherein the operation of the electric motor and the electrical energy storage system is defined based on the signals from the at least one sensing system.

4. System configured for managing the safe actuation of the auxiliary traction in road implements of claim 1, wherein the at least one sensing system comprises direct and/or indirect sensing, being comprised of at least one: angular motion sensor; vector charge sensor; brake use sensor; reverse gear sensor; wheel speed sensor; geolocation sensor; electric charge level sensor; or a combination of two or more thereof.

5. System configured for managing the safe actuation of the auxiliary traction in road implements of claim 4, wherein the sensing system operates in redundancy.

6. System configured for managing the safe actuation of the auxiliary traction in road implements of claim 4, wherein the angular motion sensor and the vector charge sensor are positioned in a coupling system between the road implement and a tractor vehicle.

7. System configured for managing the safe actuation of the auxiliary traction in road implements of claim 1, wherein the control system comprises a power management algorithm applied to the auxiliary traction element.

8. Process for managing a safe actuation of an auxiliary traction in road implements, wherein the road implement is equipped with a management system comprising at least one sensing system, which reads multiple signals from at least one sensor installed on the road implement, and a control system that selects one operating mode from a set of predefined operating modes, being: i) electric traction, ii) regenerative braking or iii) free shaft, wherein:
the control system is provided with a security mode operation, where the control system is set as default to initiate and maintain in the operating mode iii) free shaft;
the process comprising:
a. receiving, by the control system, the multiple signals read by the at least one sensing system, and identification of the ground slope degree wherein the road implement is passed through; and
b. selecting one operating mode: i) electric traction or ii) regenerative braking, by the control system, the selection being performed based on at least the slope degree identified and based on checking multiple predefined safety requirements, wherein:
the control system is able to select and change the operating mode, in order to select the mode i) electric traction or ii) regenerative braking whether said predefined multiple safety requirements are fulfilled, being the predefined multiple safety requirements related to the multiple signals provided by the at least one sensing system to the control system;
the control system returns to the operating mode iii) free shaft when the control system identifies that the predefined multiple safety requirements are unfulfilled; and
the control system is provided with an order of priority for checking two or more requirements from the predefined multiple safety requirements.

9. Process for managing the safe actuation of the auxiliary traction in road implements of claim 8, wherein the auxiliary traction involves electric traction and regenerative braking, the road implement being provided with at least one electric motor and at least one electrical energy storage system, wherein the operation mode selected by the control system comprises at least the modes: i) electric traction; ii) regenerative braking; and iii) free shaft; wherein the control system selects operating modes from predefined slope thresholds.

10. Process for managing the safe actuation of the auxiliary traction in road implements of claim 8, wherein the control system additionally selects the operating modes from a speed threshold previously defined and identified by means of at least one-speed sensor.

11. Process for managing the safe actuation of the auxiliary traction in road implements of claim 8, wherein the control system additionally selects the operating modes from an angle threshold between the road implement and a tractor vehicle to which the implement is coupled, the angulation being detected by means of at least one angular motion sensor.

12. Process for managing the safe actuation of the auxiliary traction in road implements of claim 9, wherein the operation mode i) electric traction comprises a power management step applied to the electric motor, based on the results obtained by at least a vector load sensor and/or an electrical charge level sensor for the electrical energy storage system.

13. Process for managing the safe actuation of the auxiliary traction in road implements of claim 9, wherein the operation mode i) electric traction comprises a deactivation safety stage of the electric motor, from detection of brake activation by at least one brake use sensor.

14. System for safe actuation of auxiliary traction in road implements comprising a control system communicating with an operation panel, wherein the operation panel is provided with at least one traffic route of the road implement, the said traffic route containing data of the altimetric route profile, wherein:
the control system, provided with an algorithm, selects operating modes from the data of the altimetric route profile, with the operating modes being at least one of i) traction, ii) regenerative braking, iii) free shaft, or a combination thereof;
the control system is provided with a security mode operation, where the control system is set as default to initiate and maintain in the operating mode iii) free shaft; and
the control system is provided with a rationalizing function, wherein the control system receives predictive information of ramps and slopes being comprised in the data of the altimetric route profile;
said rationalizing function choosing one or more ramps or slopes of the route to select the operating modes i) traction or ii) regenerative braking, after the control system identifies whether predefined multiple safety requirements are fulfilled;
wherein the control system returns to the iii) free shaft mode, when the predefined multiple safety requirements are unfulfilled.

* * * * *